(12) United States Patent
Begrow et al.

(10) Patent No.: US 12,454,398 B2
(45) Date of Patent: Oct. 28, 2025

(54) WRAPPED PAPERBOARD PACKAGING

(71) Applicant: Great Northern Corporation, Appleton, WI (US)

(72) Inventors: Brandon L. Begrow, Hortonville, WI (US); Daniel J. Rivers, Appleton, WI (US)

(73) Assignee: Great Northern Corporation, Appleton, WI (US)

( * ) Notice: Subject to any disclaimer, the term of this patent is extended or adjusted under 35 U.S.C. 154(b) by 146 days.

(21) Appl. No.: 18/470,085

(22) Filed: Sep. 19, 2023

(65) Prior Publication Data

US 2024/0001662 A1 Jan. 4, 2024

Related U.S. Application Data

(63) Continuation of application No. 17/943,158, filed on Sep. 12, 2022, now Pat. No. 11,794,458, which is a
(Continued)

(51) Int. Cl.
*B65D 81/05* (2006.01)
*B31D 5/00* (2017.01)
(Continued)

(52) U.S. Cl.
CPC ........... *B65D 81/054* (2013.01); *B31D 5/006* (2013.01); *B31D 5/04* (2013.01); *B32B 1/00* (2013.01);
(Continued)

(58) Field of Classification Search
CPC ..... Y10T 428/24256; Y10T 428/24258; Y10T 428/2424; Y10T 428/24231;
(Continued)

(56) References Cited

U.S. PATENT DOCUMENTS

| 1,852,832 A | 4/1932 | Beaman |
| 1,989,794 A | 2/1935 | Duvall |

(Continued)

FOREIGN PATENT DOCUMENTS

| CA | 1183764 A | 3/1985 |
| CA | 2174894 C | 6/1999 |

(Continued)

*Primary Examiner* — Scott W Dodds
(74) *Attorney, Agent, or Firm* — Michael Best & Friedrich LLP

(57) ABSTRACT

A method of manufacturing a packaging structure. The packaging structure includes a first ply having a first end, a second end, and a first width extending between the first and second ends, a plurality of second plies, and a third ply. The method includes adhering the first ply, the one second ply, the other second ply, and the third ply. The method further includes wrapping the one second ply around the first end of the first ply and not the second end of the first ply, wrapping the other second ply around the second end of the first ply and not the first end of the first ply, and wrapping the third ply around the first ply and the plurality of second plies to form a flat paperboard structure of approximately the first width. Moreover, the method includes bending the flat paperboard structure to form the packaging structure.

20 Claims, 37 Drawing Sheets

Related U.S. Application Data continuation of application No. 16/569,238, filed on Sep. 12, 2019.

(60) Provisional application No. 62/730,411, filed on Sep. 12, 2018.

(51) Int. Cl.
| | |
|---|---|
| *B31D 5/04* | (2017.01) |
| *B32B 1/00* | (2006.01) |
| *B32B 3/04* | (2006.01) |
| *B32B 29/00* | (2006.01) |
| *B65D 65/40* | (2006.01) |
| *B32B 37/12* | (2006.01) |

(52) U.S. Cl.
CPC .............. *B32B 3/04* (2013.01); *B32B 29/005* (2013.01); *B65D 65/40* (2013.01); *B32B 37/12* (2013.01); *B32B 2250/26* (2013.01); *B32B 2553/00* (2013.01); *B65D 2581/053* (2013.01)

(58) Field of Classification Search
CPC . Y10T 428/24198; B32B 3/04; B32B 29/005; B65D 81/054
USPC .......................................... 428/122, 126–130
See application file for complete search history.

(56) References Cited

U.S. PATENT DOCUMENTS

| | | | |
|---|---|---|---|
| 2,160,221 | A | 5/1939 | Masters et al. |
| 2,507,929 | A | 5/1950 | Pennebaker |
| 2,575,898 | A | 11/1951 | Tadinger |
| 3,072,313 | A | 1/1963 | Svendsen |
| 3,129,868 | A | 4/1964 | Jenk |
| 3,200,944 | A | 8/1965 | Rapata |
| 3,337,111 | A | 8/1967 | Petriekis et al. |
| 3,368,736 | A | 2/1968 | Mckellick |
| 3,433,354 | A | 3/1969 | Liebel |
| 3,511,464 | A | 5/1970 | Doll |
| 3,536,245 | A | 10/1970 | Palmer |
| 3,672,952 | A | 6/1972 | Brown et al. |
| 3,725,170 | A | 4/1973 | Doll |
| 3,734,389 | A | 5/1973 | Brown |
| 3,734,392 | A | 5/1973 | Clark |
| 3,825,169 | A | 7/1974 | Meyers |
| 3,879,253 | A | 4/1975 | Doll |
| 3,955,677 | A | 5/1976 | Collingwood |
| 4,214,695 | A | 7/1980 | Cooper |
| 4,247,289 | A | 1/1981 | McCabe |
| 4,375,852 | A | 3/1983 | Johnston et al. |
| 4,399,915 | A | 8/1983 | Sorenson |
| 4,440,304 | A | 4/1984 | Konopko |
| 4,473,368 | A | 9/1984 | Meyer |
| 4,771,893 | A | 9/1988 | Liebel |
| 4,976,374 | A | 12/1990 | Macaluso |
| 5,131,541 | A | 7/1992 | Liebel |
| 5,161,692 | A | 11/1992 | Knierim |
| 5,181,611 | A | 1/1993 | Liebel |
| 5,275,677 | A | 1/1994 | Morley |
| 5,437,370 | A | 8/1995 | Marco |
| D370,629 | S | 6/1996 | Lynch |
| 5,588,585 | A | 12/1996 | McClure |
| 5,613,335 | A | 3/1997 | Rennich et al. |
| 5,657,863 | A | 8/1997 | Olsen |
| 5,733,403 | A | 3/1998 | Morley |
| 5,813,537 | A | 9/1998 | Dereu et al. |
| 5,845,871 | A | 12/1998 | Lynch et al. |
| 5,914,171 | A | 6/1999 | Morley |
| 5,918,800 | A | 7/1999 | Goshorn et al. |
| 5,947,290 | A | 9/1999 | Loeschen |
| 6,051,092 | A | 4/2000 | Lynch et al. |
| 6,186,329 | B1 | 2/2001 | Qui |
| 6,286,683 | B1 | 9/2001 | Hunt et al. |
| 6,453,966 | B1 | 9/2002 | Ostroff |
| 6,527,119 | B1 | 3/2003 | Markert et al. |
| 6,540,080 | B2 | 4/2003 | Moreyra |
| 6,561,357 | B2 | 5/2003 | Renck |
| 6,915,603 | B2 | 7/2005 | Hunt |
| 7,097,895 | B2 | 8/2006 | Amendt et al. |
| 7,111,734 | B2 | 9/2006 | Robinson, Jr. |
| 7,128,214 | B2 | 10/2006 | Qui et al. |
| 7,216,765 | B2 | 5/2007 | Markert et al. |
| 7,299,924 | B2 | 11/2007 | Robinson, Jr. |
| 7,334,381 | B2 | 2/2008 | Mertz, II et al. |
| 7,351,188 | B2 | 4/2008 | Schaller et al. |
| 7,383,952 | B2 | 6/2008 | Kruelle et al. |
| 7,485,360 | B2 | 2/2009 | Barnes et al. |
| 7,634,892 | B2 | 12/2009 | Ausnit |
| 7,661,579 | B2 | 2/2010 | Kruelle et al. |
| 7,703,399 | B2 | 4/2010 | Person |
| 7,841,469 | B2 | 11/2010 | Muyskens |
| 7,878,126 | B2 | 2/2011 | Markert et al. |
| 8,038,010 | B1 | 10/2011 | Rometty et al. |
| D648,866 | S | 11/2011 | D'Anglade |
| 8,083,203 | B2 | 12/2011 | Fournier |
| D661,817 | S | 6/2012 | Fournier et al. |
| 8,313,080 | B2 | 11/2012 | Fournier et al. |
| 8,342,334 | B2 | 1/2013 | Leibreich et al. |
| 8,407,970 | B2 | 4/2013 | Rometty et al. |
| 8,443,975 | B2 | 5/2013 | Butch, Jr. et al. |
| 8,474,687 | B2 | 7/2013 | Rometty et al. |
| 8,753,731 | B2 | 6/2014 | Dunn |
| 8,770,465 | B2 | 7/2014 | Rometty et al. |
| D710,694 | S | 8/2014 | D'Anglade |
| 9,005,095 | B2 | 4/2015 | D'Anglade |
| 9,090,388 | B2 | 7/2015 | Kruelle et al. |
| D744,332 | S | 12/2015 | D'Anglade |
| D751,898 | S | 3/2016 | D'Anglade |
| 9,278,507 | B2 | 3/2016 | Rancich et al. |
| 9,327,484 | B2 | 5/2016 | Herring et al. |
| 9,334,082 | B2 | 5/2016 | D'Anglade |
| D784,560 | S | 4/2017 | D'Anglade |
| D798,154 | S | 9/2017 | D'Anglade et al. |
| 9,764,527 | B2 | 9/2017 | D'Anglade |
| 10,099,444 | B2 | 10/2018 | D'Anglade |
| 2003/0111383 | A1 | 6/2003 | Qui et al. |
| 2004/0159075 | A1 | 8/2004 | Matthews |
| 2004/0255537 | A1 | 12/2004 | Dalgleish et al. |
| 2005/0087663 | A1 | 4/2005 | Schroeder |
| 2005/0121356 | A1 | 6/2005 | Wisecarver |
| 2006/0016150 | A1 | 1/2006 | Fournier |
| 2007/0215495 | A1 | 9/2007 | O'Hara et al. |
| 2008/0197266 | A1 | 8/2008 | Fournier |
| 2009/0179137 | A1 | 7/2009 | Fournier et al. |
| 2009/0236466 | A1 | 9/2009 | D'Anglade |
| 2010/0072096 | A1 | 3/2010 | Wu et al. |
| 2011/0119885 | A1 | 5/2011 | D'Anglade |
| 2011/0272555 | A1 | 11/2011 | Fournier |
| 2012/0000815 | A1 | 1/2012 | Butch, Jr. et al. |
| 2012/0325719 | A1 | 12/2012 | Jian |
| 2013/0140306 | A1 | 6/2013 | D'Anglade |
| 2014/0050897 | A1 | 2/2014 | Rometty et al. |
| 2014/0069842 | A1 | 3/2014 | D'Anglade |
| 2014/0263304 | A1 | 9/2014 | Guertin |
| 2016/0288444 | A1 | 10/2016 | D'Anglade |
| 2017/0341333 | A1 | 11/2017 | D'Anglade |
| 2018/0022525 | A1 | 1/2018 | D'Anglade |
| 2019/0270570 | A1* | 9/2019 | Jette ..................... B65D 81/054 |

FOREIGN PATENT DOCUMENTS

| | | | |
|---|---|---|---|
| CA | 2263044 | C | 8/1999 |
| CA | 2475085 | A1 | 1/2006 |
| CA | 130905 | S | 2/2010 |
| CA | 130906 | S | 2/2010 |
| CA | 128833 | S | 5/2010 |
| CA | 135014 | S | 5/2010 |
| CA | 135015 | S | 5/2010 |
| CA | 2738558 | A1 | 1/2012 |
| CA | 2808537 | A1 | 2/2012 |
| CA | 143619 | S | 5/2012 |
| CA | 143620 | S | 5/2012 |
| CA | 140780 | S | 10/2012 |

(56) References Cited

FOREIGN PATENT DOCUMENTS

| | | | |
|---|---|---|---|
| CA | 142581 | S | 10/2012 |
| CA | 161350 | S | 10/2015 |
| CA | 2950194 | A1 | 2/2017 |
| CN | 200988645 | Y | 12/2007 |
| CN | 201125014 | Y | 10/2008 |
| CN | 201712903 | U | 1/2011 |
| DE | 29509037 | U1 | 9/1995 |
| DE | 20012816 | U1 | 12/2000 |
| DE | 202009015492 | U1 | 10/2010 |
| DE | 202015105054 | U1 | 10/2015 |
| DE | 202017005256 | U1 | 11/2017 |
| EP | 1215125 | A1 | 6/2002 |
| ES | 2163969 | A1 | 2/2002 |
| FR | 986133 | A | 7/1951 |
| FR | 1150912 | A | 1/1958 |
| FR | 1451433 | A | 1/1966 |
| FR | 2081291 | A7 | 12/1971 |
| FR | 2510943 | A1 | 2/1983 |
| FR | 2512734 | A1 | 3/1983 |
| FR | 2708914 | A1 | 2/1995 |
| FR | 2734248 | A1 | 11/1996 |
| FR | 2766459 | A1 | 1/1999 |
| GB | 964153 | A | 7/1964 |
| GB | 1058168 | A | 2/1967 |
| JP | H 06115567 | A | 4/1994 |
| JP | 2003292046 | A | 10/2003 |
| JP | 5229574 | B2 | 7/2013 |
| KR | 19980025354 | U | 8/1998 |
| KR | 20010090307 | A | 10/2001 |
| TW | M 297354 | U | 9/2006 |
| TW | M 321239 | Y | 11/2007 |
| WO | WO 199118807 | A1 | 12/1991 |
| WO | WO 200005150 | A1 | 2/2000 |
| WO | WO 2012003054 | A1 | 1/2012 |
| WO | WO 2015140640 | A2 | 9/2015 |
| WO | WO 2016131142 | A1 | 8/2016 |
| WO | WO 2018115746 | A1 | 6/2018 |

\* cited by examiner

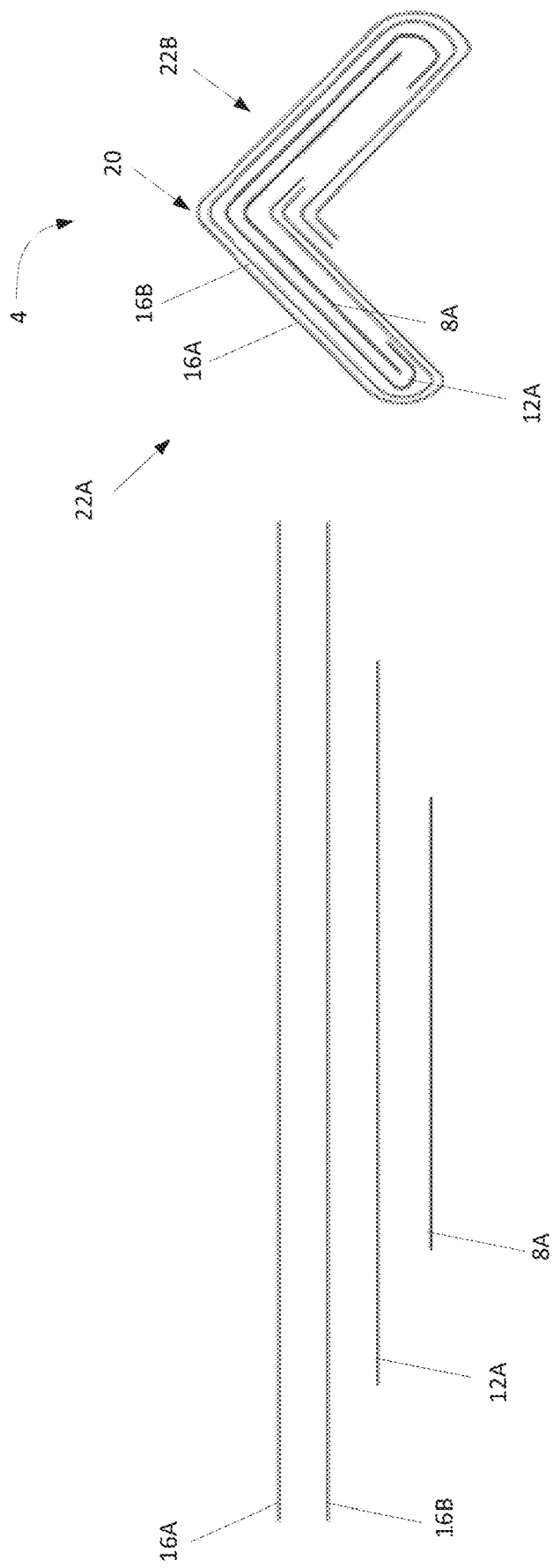

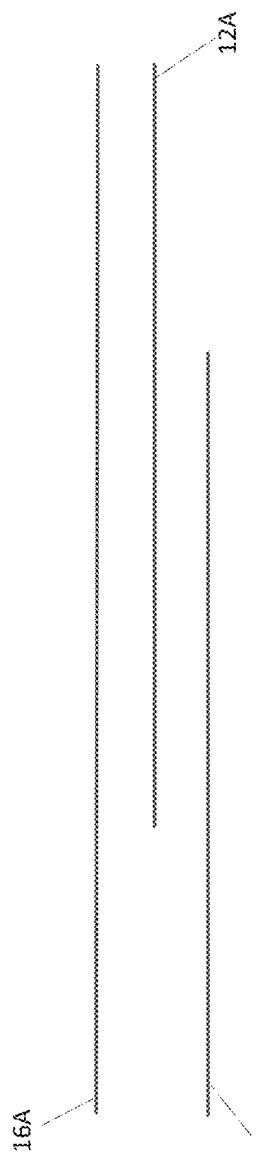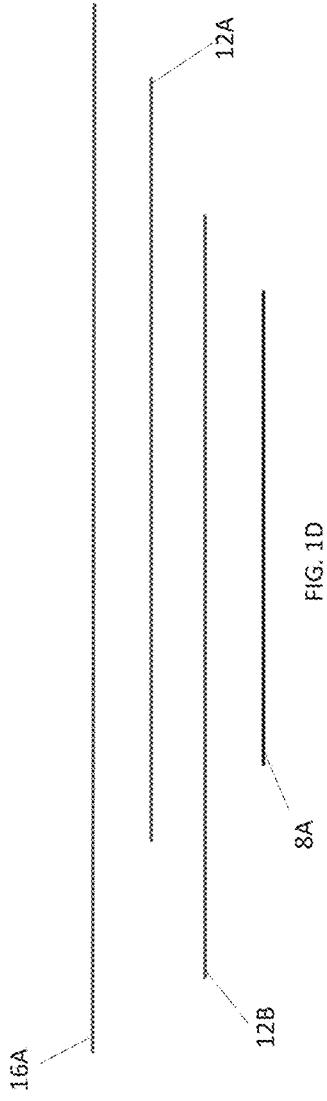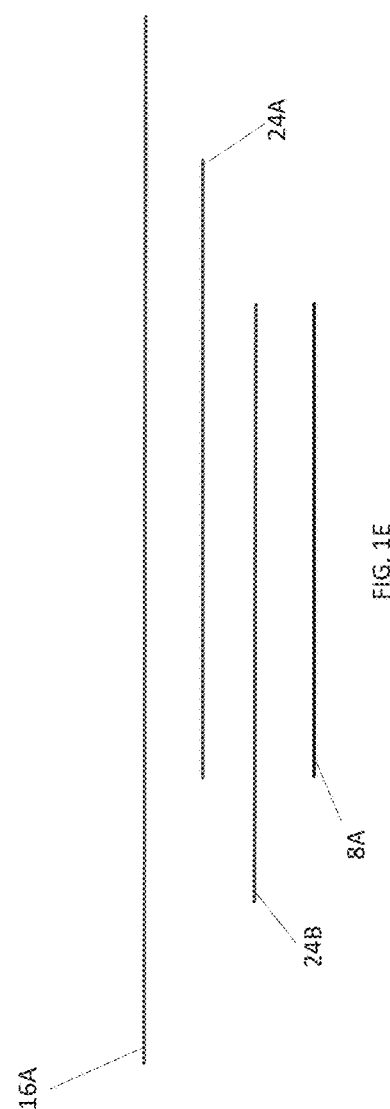

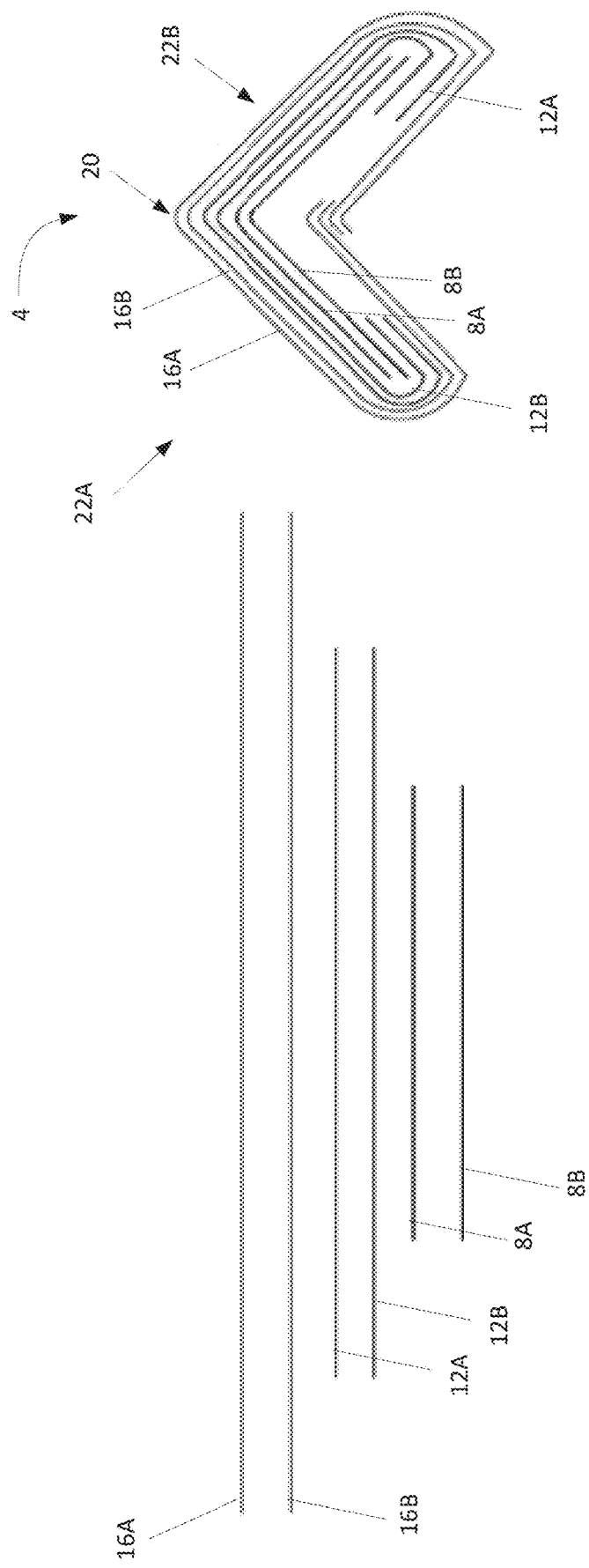

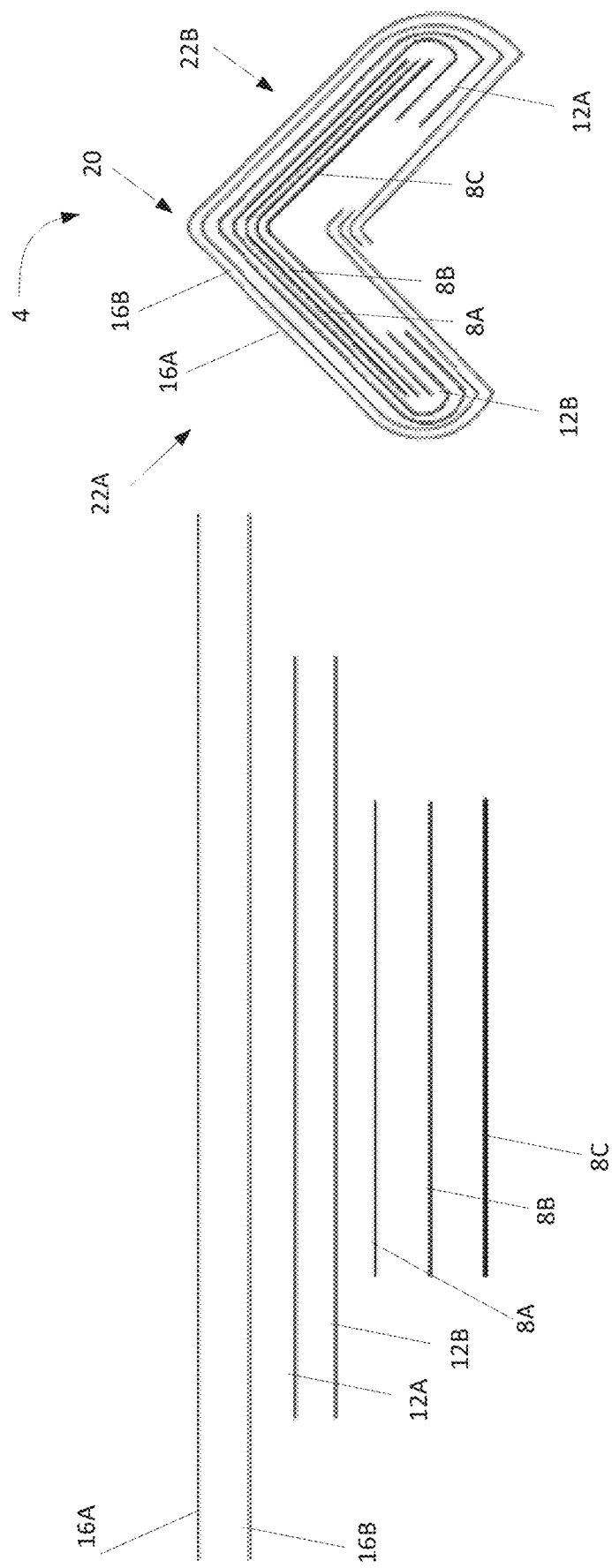

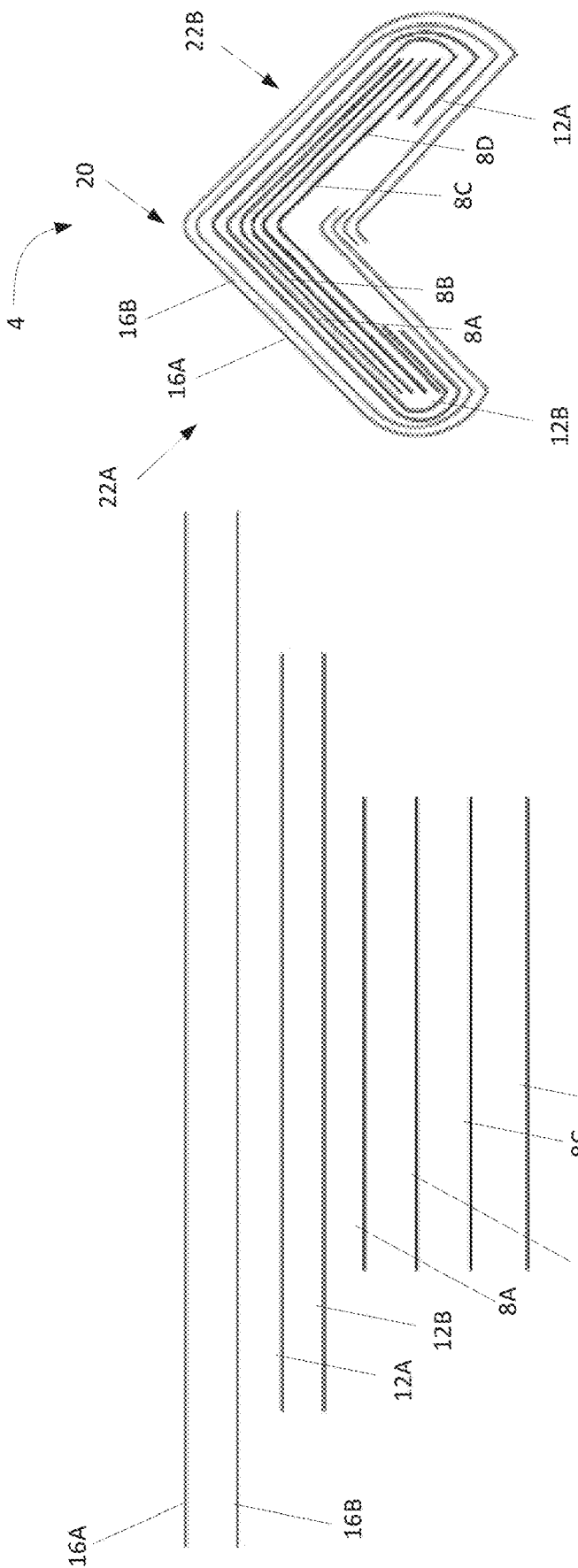

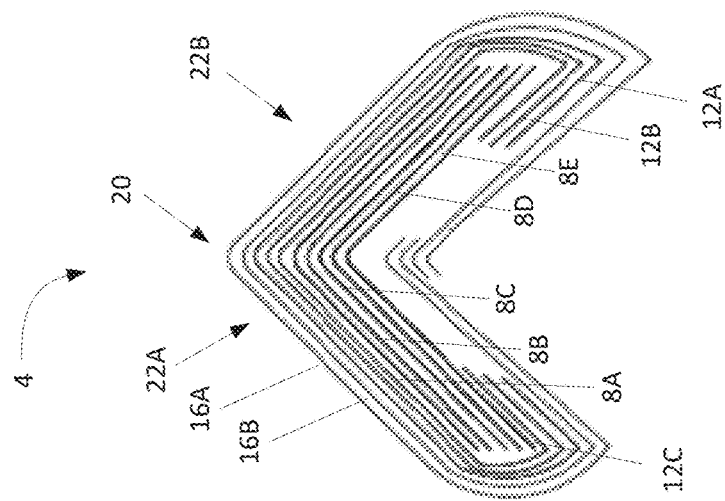
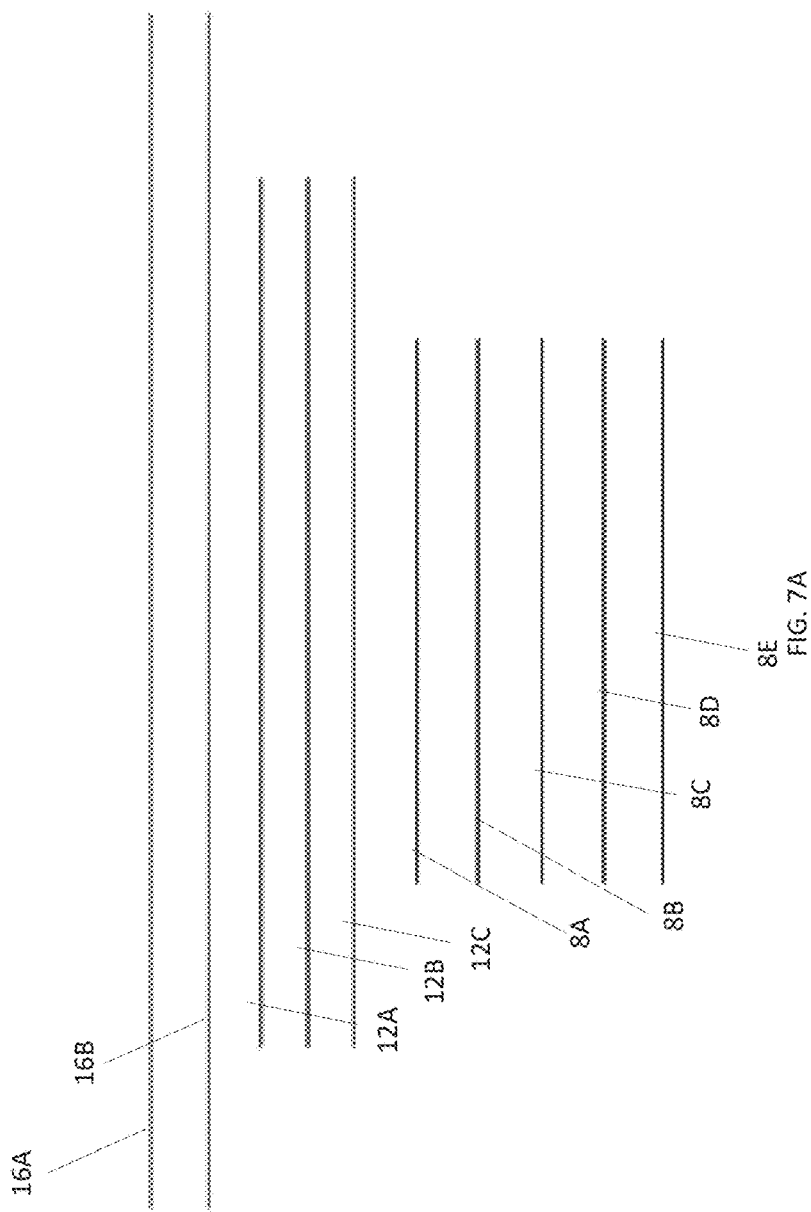

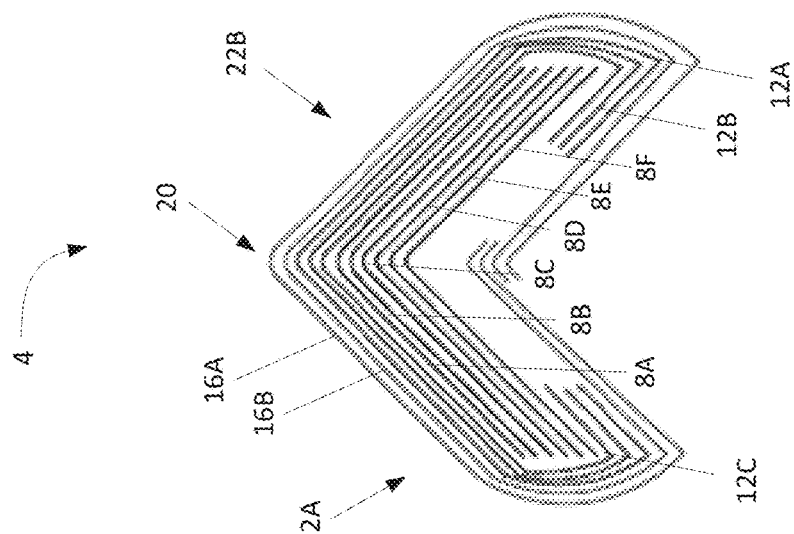
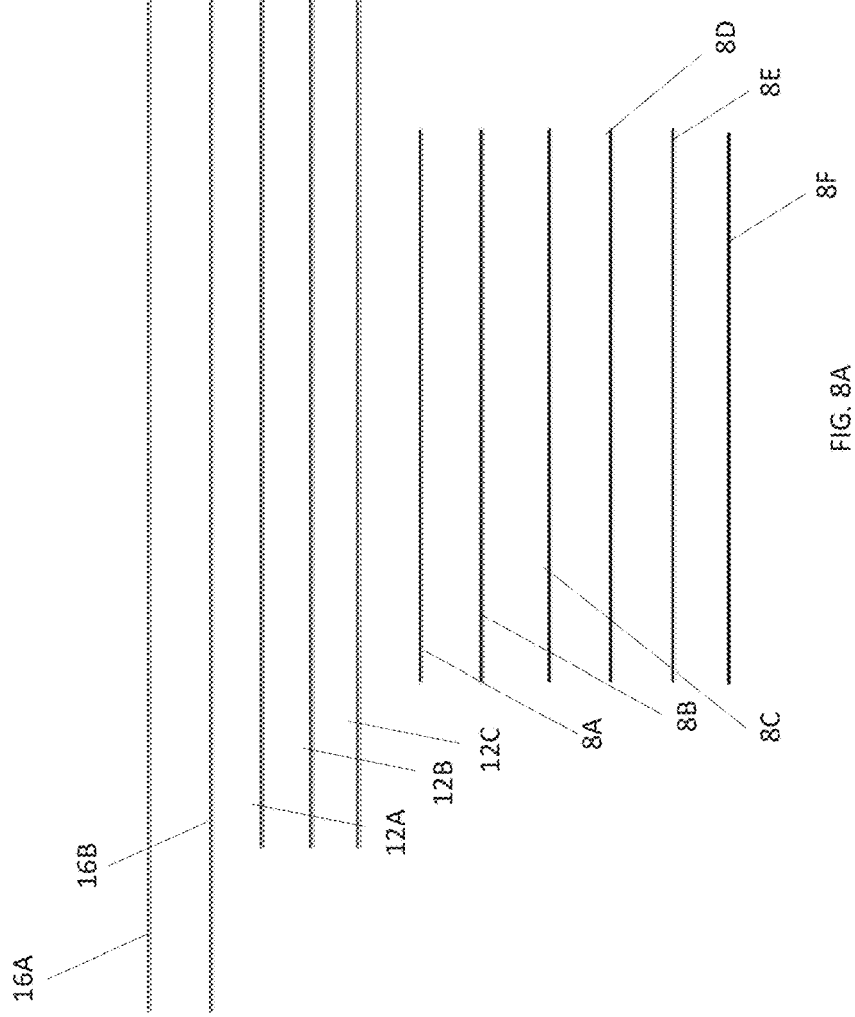

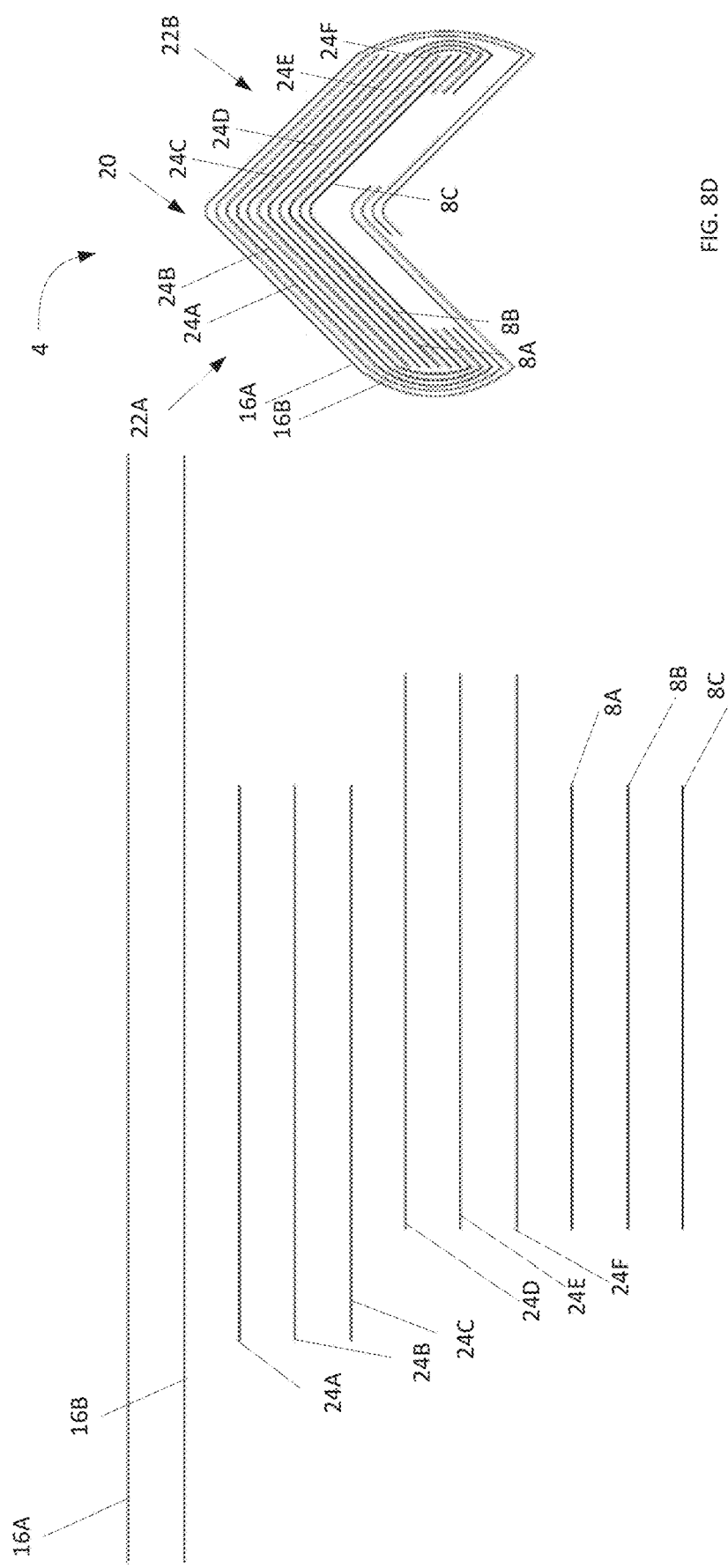

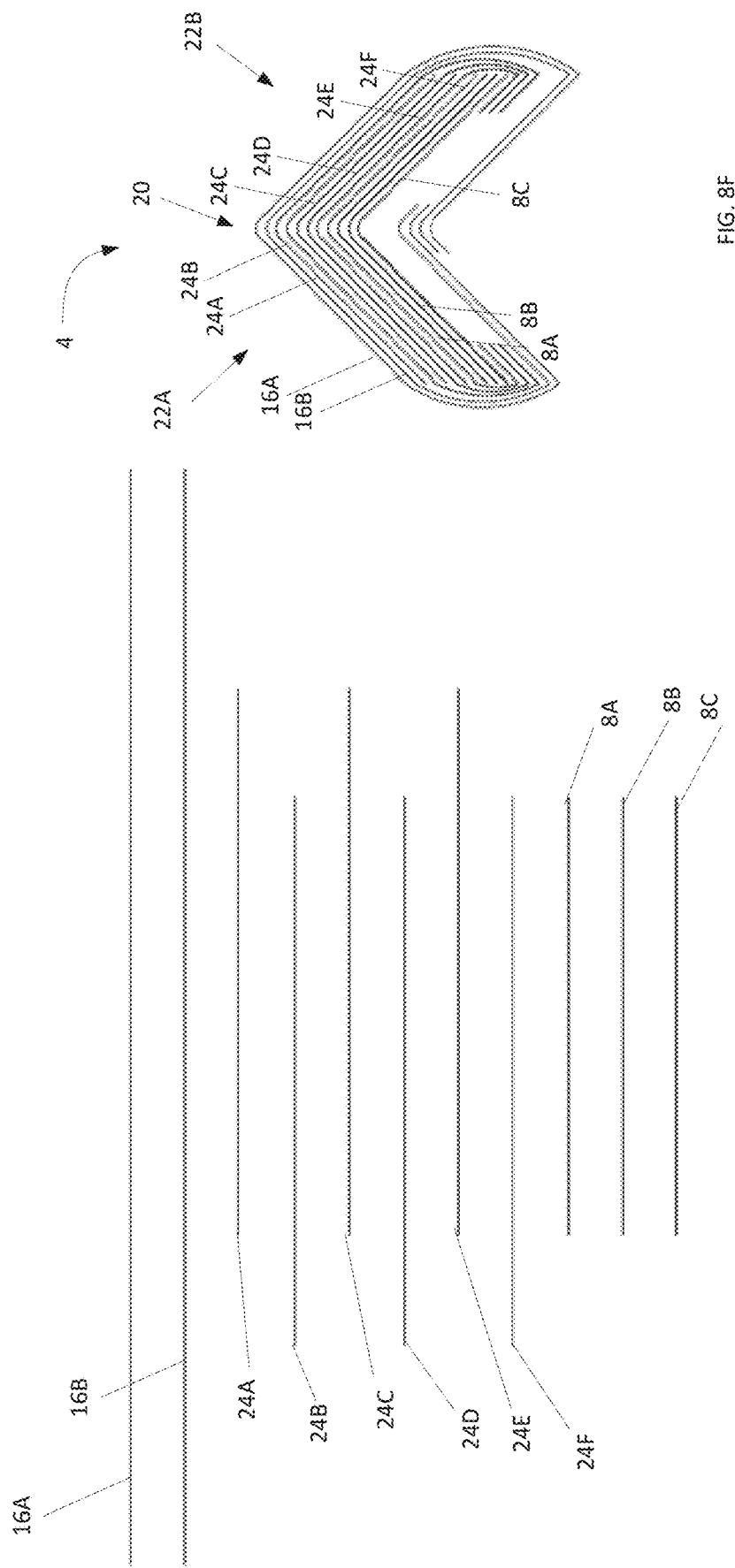

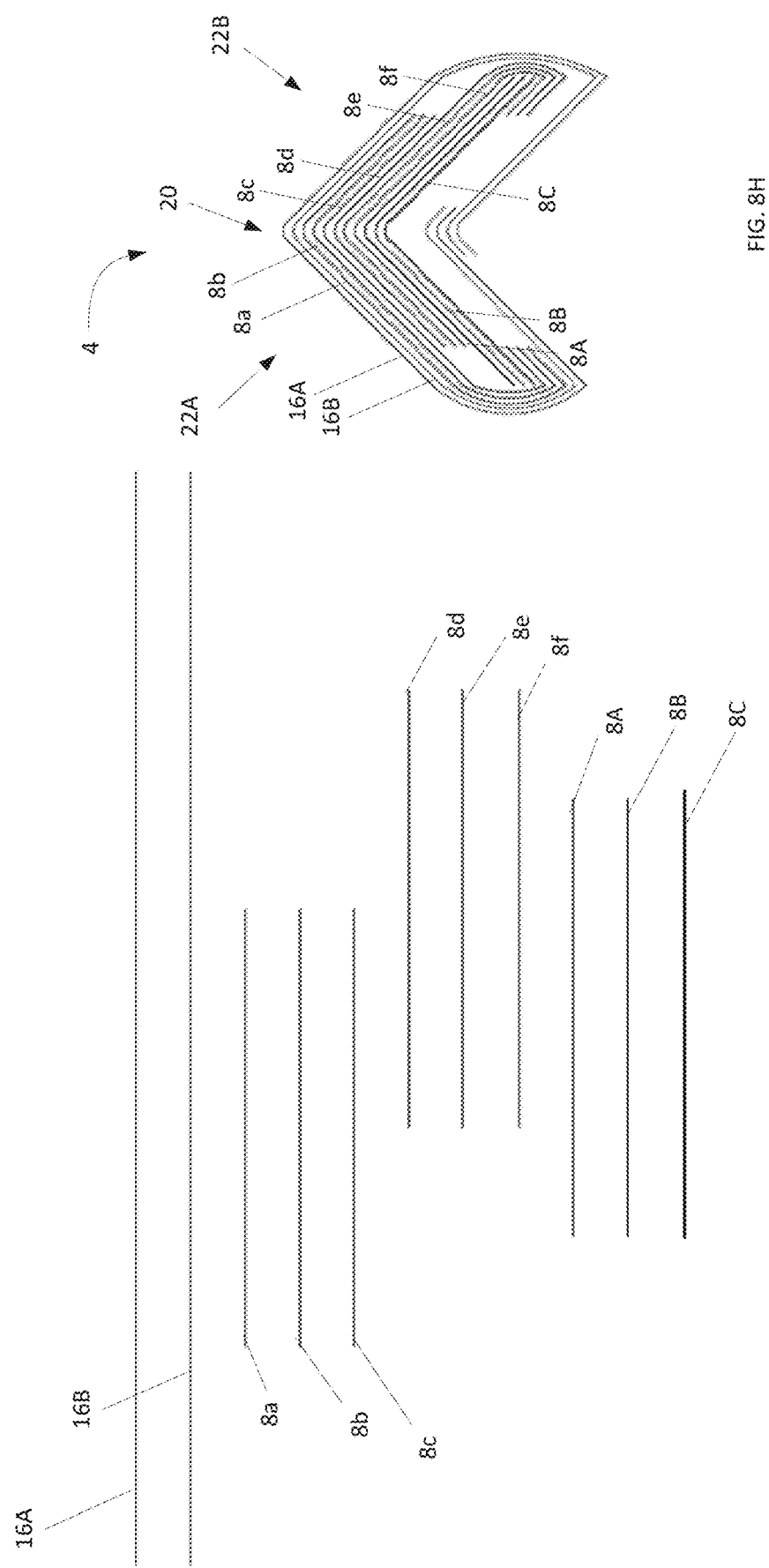

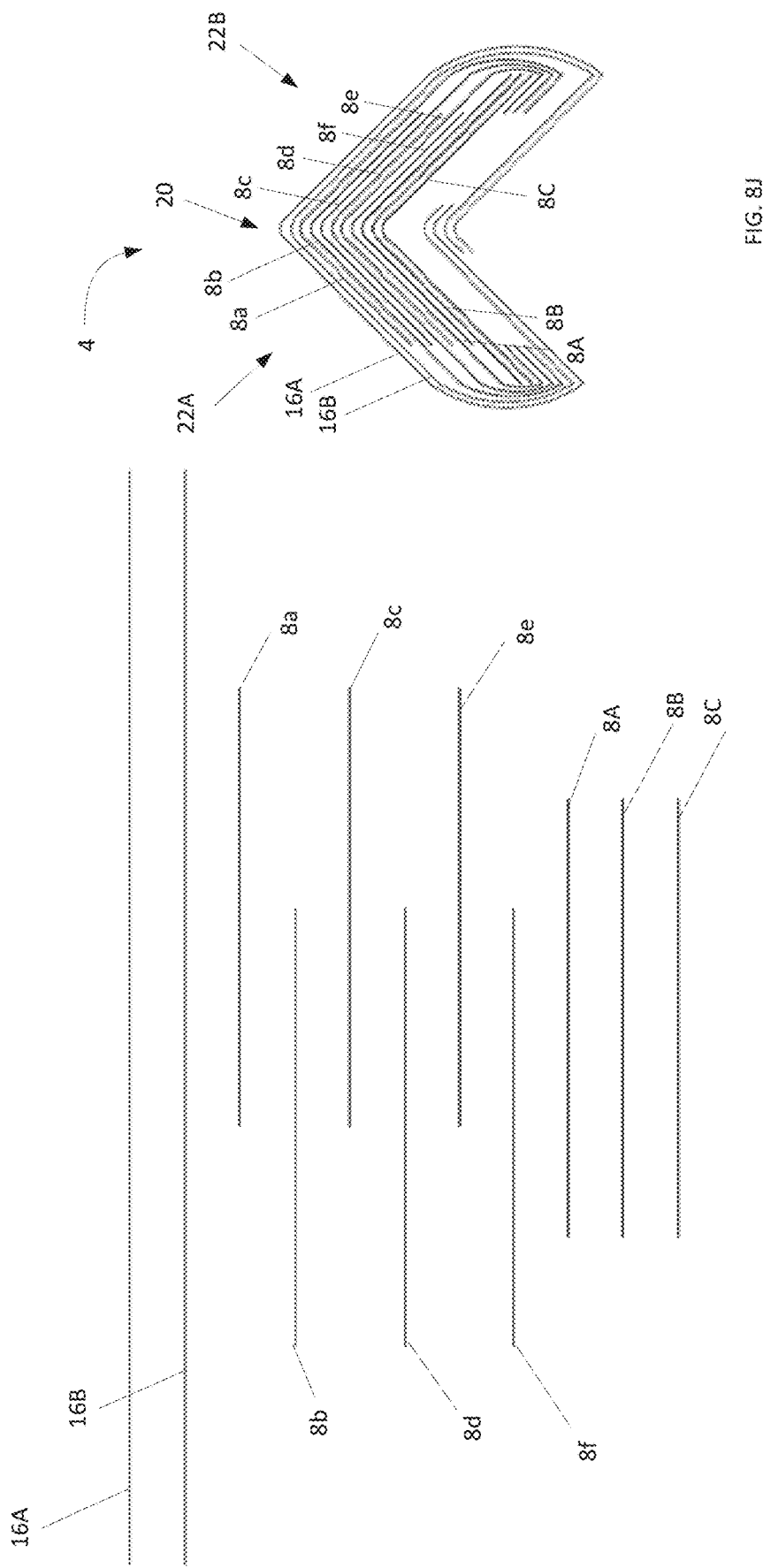

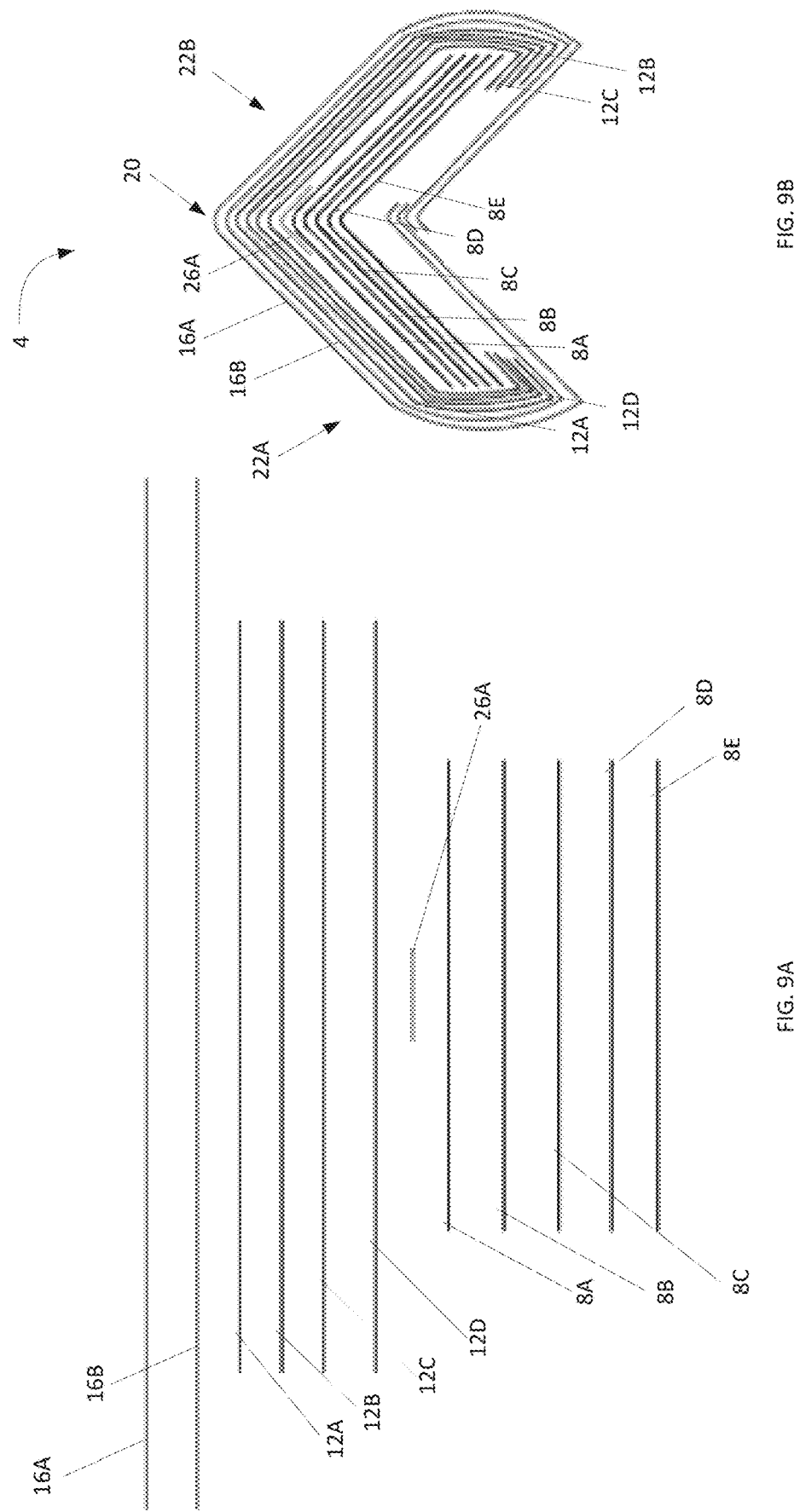

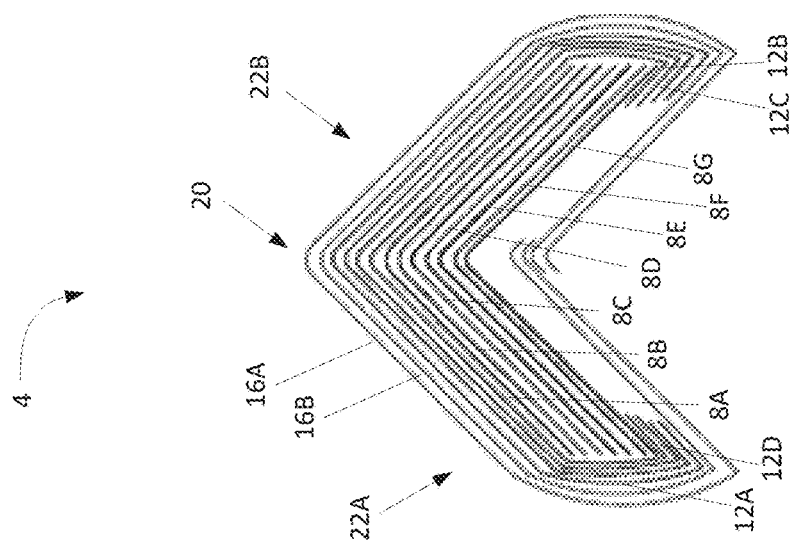
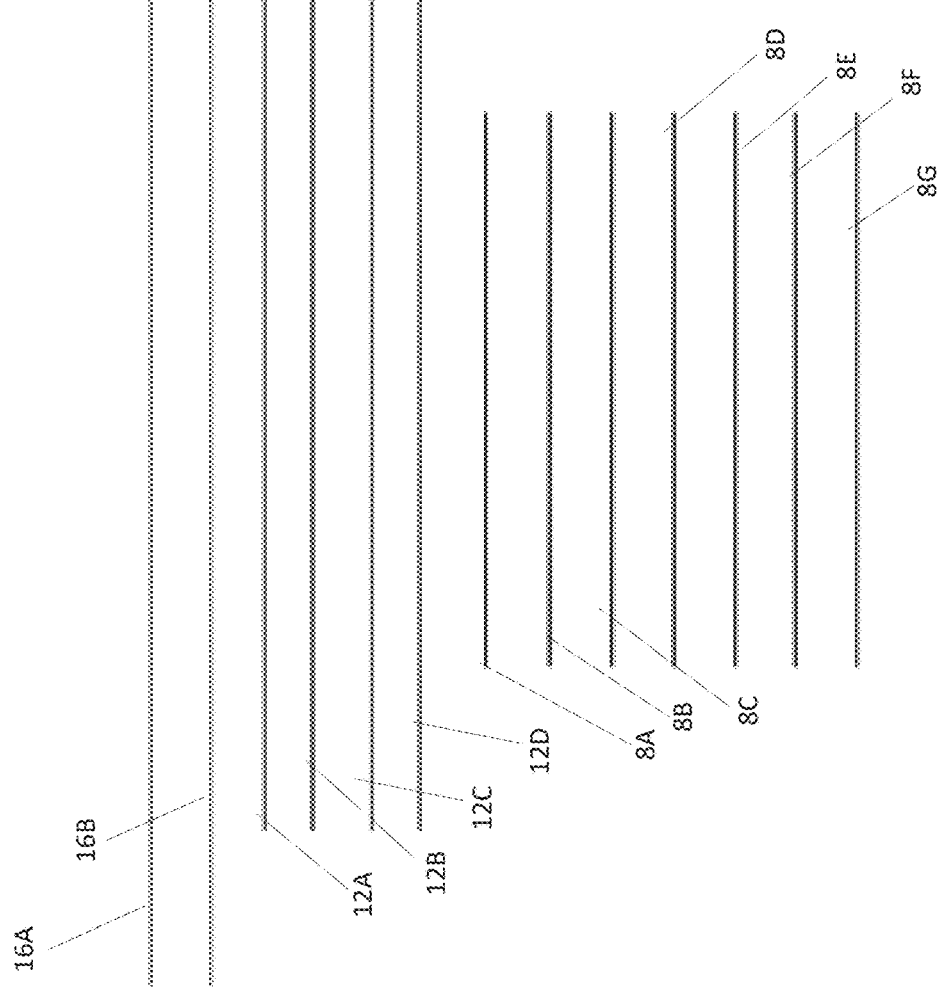

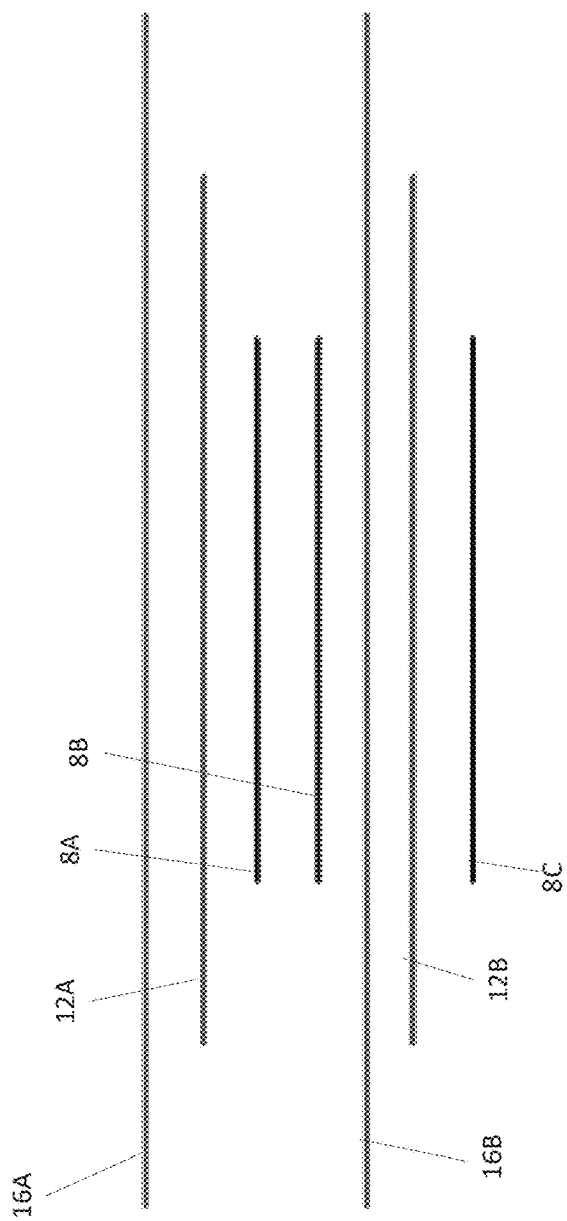
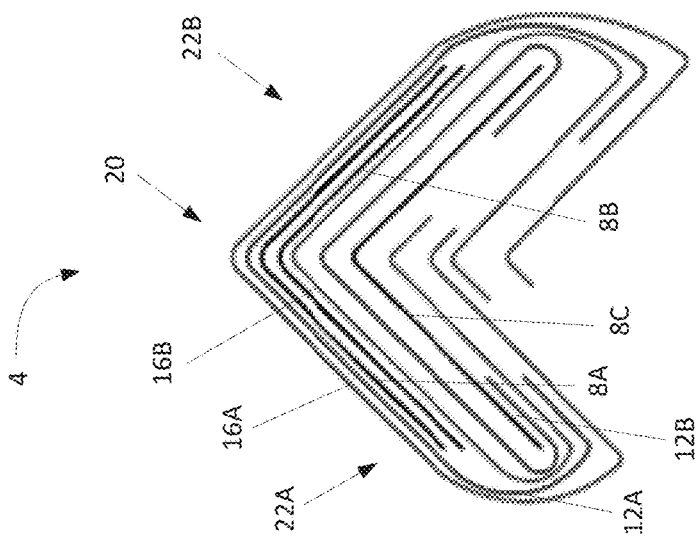
FIG. 15A
FIG. 15B

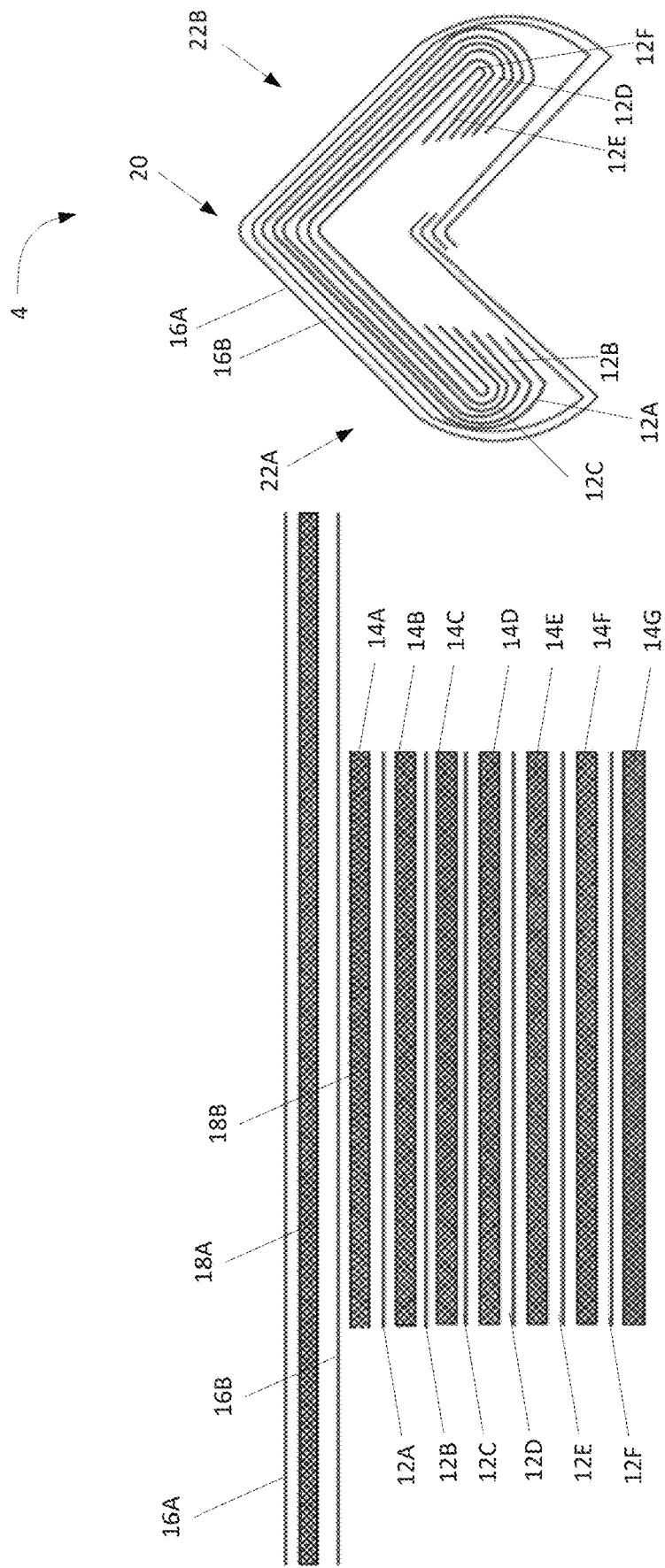

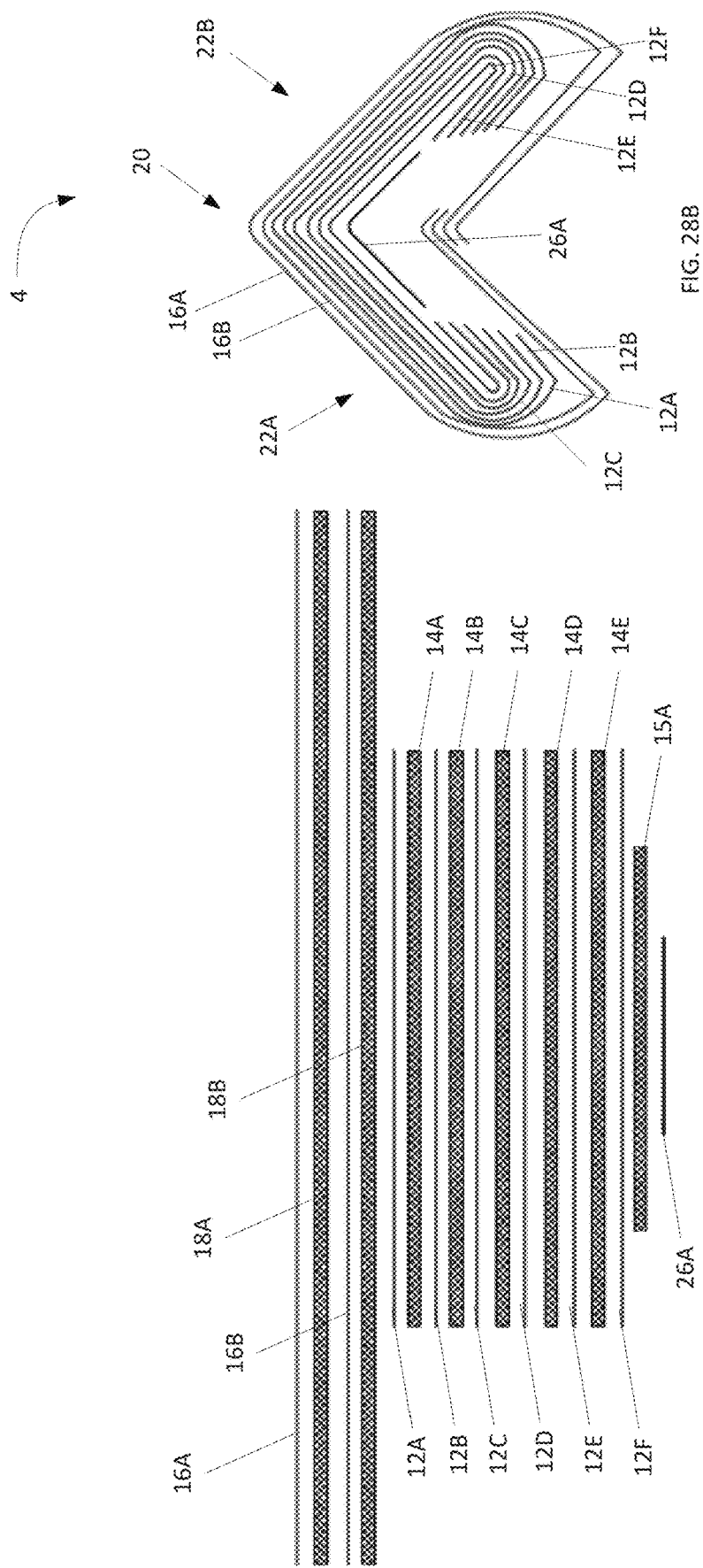

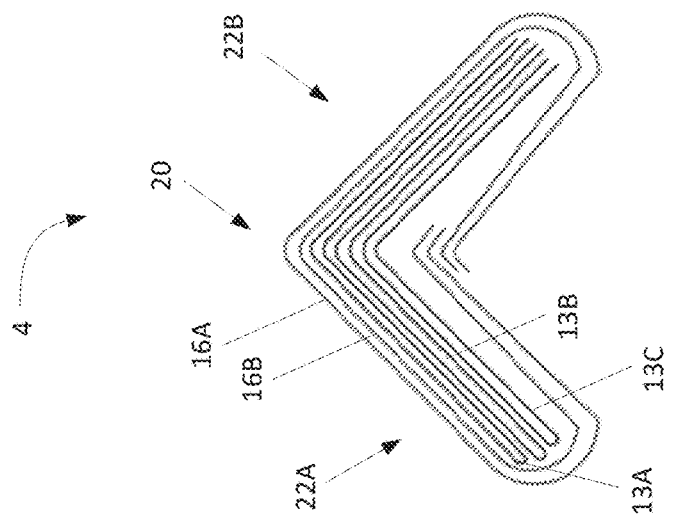
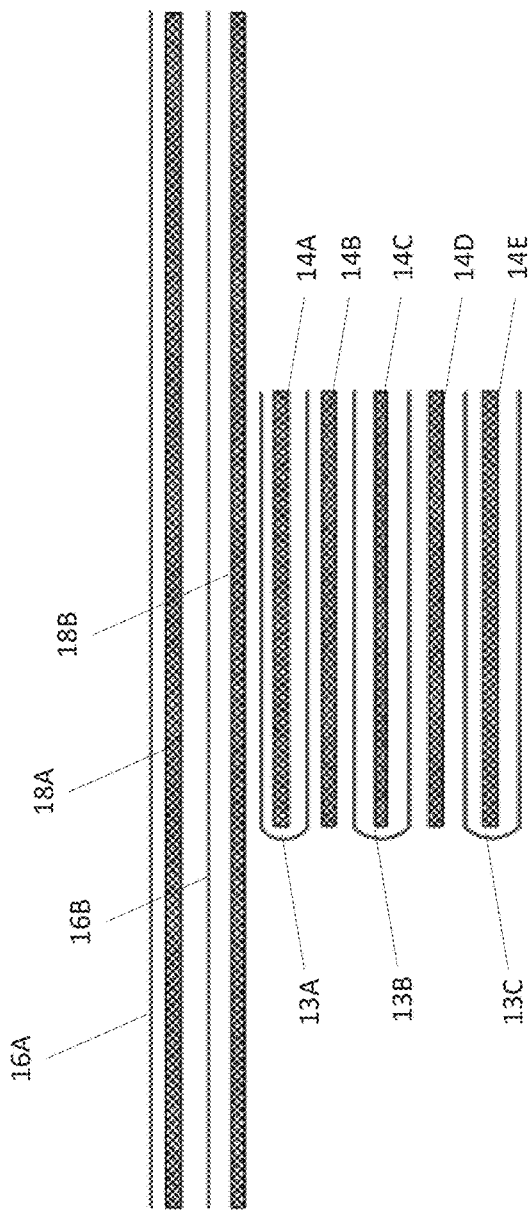
FIG. 29B
FIG. 29A

WRAPPED PAPERBOARD PACKAGING

RELATED APPLICATIONS

The present application is a continuation of U.S. patent application Ser. No. 17/943,158, filed Sep. 12, 2022, which is a continuation of U.S. patent application Ser. No. 16/569,238, filed Sep. 12, 2019, which claims the benefit of U.S. Provisional Application No. 62/730,411, filed Sep. 12, 2018, the entire contents of each of which are hereby incorporated by reference.

FIELD

The present application generally relates to paperboard structures, and, in particular, packaging structures, such as an edge protector, a corner board, etc., formed of wrapped paperboard.

SUMMARY

In one independent aspect, a method for forming a packaging structure, such as, for example, an edge protector, a corner board, etc., may generally include providing a first ply having a first width, a plurality of second plies, each second ply having a second width wider than the first width, and a third ply having a third width wider than the second width; forming a flat paperboard structure of the first ply, the plurality of second plies, and the third ply, forming a flat paperboard structure including gluing together the first ply, the plurality of second plies, and the third ply; wrapping the flat paperboard structure to approximately the first width, wrapping including wrapping the plurality of second plies around ends of the first ply, and wrapping the third ply around the first ply and the plurality second plies; and bending a portion of the flat paperboard structure to form the packaging structure.

In yet another independent aspect, a method for forming a packaging structure, such as, for example, an edge protector, a corner board, etc., may generally include determining a configuration (e.g., shape, caliper, dimension, etc.) of the packaging structure to be manufactured; determining an available supply of paperboard layers; based on the configuration of the packaging structure and the available supply, determining a stackup of paperboard layers for the packaging; providing at least one first ply having a first width, at least one second ply having a second width wider than the first width, and at least one third ply having a third width wider than the second width; and forming the packaging structure of the at least one first ply, the at least one second ply, and the at least one third ply.

In yet another independent aspect, a method for forming a packaging structure, such as, for example, an edge protector, a corner board, etc., may generally include providing a plurality of first plies, each first ply having a first width, a plurality of second plies, each second ply having a second width wider than the first width, and a third ply having a third with wider than the second width; forming a flat paperboard structure of the plurality of first plies, the plurality of second plies, and the third ply, forming a flat paperboard structure including gluing together the plurality of first plies, the plurality of second plies, and the third ply; wrapping the flat paperboard structure to approximately the first width, wrapping including wrapping the plurality of second plies around ends of the plurality of first plies, wrapping the third ply around the plurality of first plies and the plurality of second plies; and bending a portion of the flat paperboard structure to form the packaging structure.

Other independent features and independent aspects of the invention may become apparent by consideration of the following detailed description and accompanying drawings.

BRIEF DESCRIPTION OF THE DRAWINGS

FIGS. 1A-11B and 13A-29B are schematic diagrams of exemplary packaging structures, such as, for example, an edge protector, a corner board, etc.

DETAILED DESCRIPTION

Figure 5B:
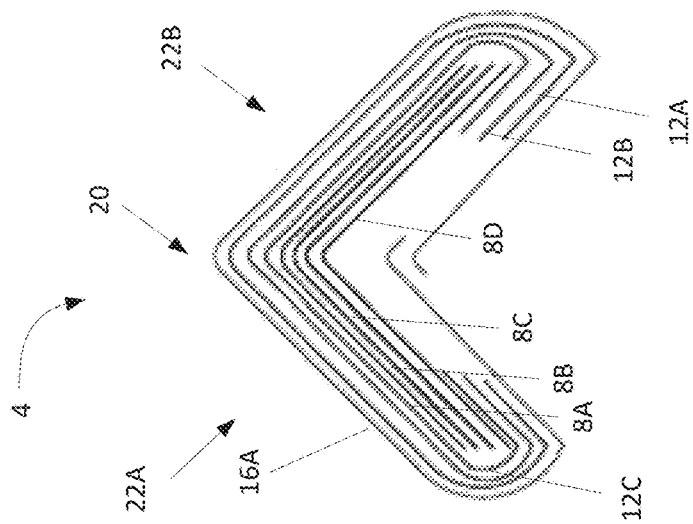

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Packaging, such as an edge protector, a corner board, etc., may be used to protect items (e.g., at least an edge, a corner, a surface portion, etc.) during shipping. As described below, the exemplary packaging structure (e.g., corner boards, as illustrated) is formed of multiple wrapped paperboard plies of a number of different widths. The method of manufacturing the packaging structure may provide flexibility to manufacture a selected packaging configuration with a given available supply of the paperboard. The cost to build and/or the amount of paperboard used to manufacture the packaging structure may be optimized.

FIGS. 1A-1B illustrate packaging structure 4 formed of paperboard plies 8, 12, 16. FIG. 1A illustrates a stackup of the paperboard plies to form the packaging structure 4, and FIG. 1B illustrates the packaging structure 4 formed using the illustrated stackup of the paperboard plies and configured as a corner board 4 having an apex 20 with leg portions 22 on each side. The illustrated corner board 4 of FIGS. 1A-1B has a caliper thickness of about 0.090 inches (in.).

In the illustrated construction, the corner board 4 is formed of different plies 8, 12, 16 of different widths. The innermost ply 8A has a first width X approximately equal to the width of the flat, wrapped paperboard structure. An intermediate second ply 12A has a second width Y greater than the first width X. One or more (two shown) wider outer plies 16A, 16B each have substantially the same width—a third width Z greater than the second width Y.

In the packaging structure 4, wider plies (e.g., plies having a width wider than the width X of the ply or plies which are not wrapped (the first ply 8A), extending beyond at least one end of the ply or plies which are not wrapped (again, the first ply 8A), etc.) are wrapped. In the illustrated example, the second ply 12A wraps around the opposite ends of the first ply 8A, and the third plies 16A, 16B wrap around the wrapped second ply 12A and the first ply 8A.

The outer plies 16A, 16B overlap at a portion (e.g., at the apex 20) of the corner board 4 while the narrower intermediate ply 12A only wraps around portions of the legs 22A, 22B. The area of the overlapped plies 16A, 16B has increased caliper thickness at the apex 20. Wrapped portions of the intermediate ply 12A (e.g., proximate the ends of the legs 22A, 22B) may also have increased caliper thickness.

FIG. 1C illustrates an alternative stackup for the packaging structure 4 shown in FIG. 1A-1B to also provide a packaging structure 4 having a caliper thickness of about 0.090 in. Rather than one second ply 12A and two third plies 16A, 16B, the illustrated stackup includes two second plies 12A, 12B and one third ply 16A.

As shown in FIG. 1C, the second plies 12A, 12B are staggered, and each will wrap around only one end of the first ply 8A. As illustrated, the full width of the two second plies 12A, 12B is approximately equal to the width Z of the third ply 16A. As a result, when wrapped (not shown), the wrapped ends of the second plies 12A, 12B will also overlap the apex 20.

FIG. 1D illustrates an alternative stackup to that shown in FIG. 1C. As shown in FIG. 1D, each second ply 12A, 12B extends beyond and will wrap around both ends of the ply 8A, but by different amounts (e.g., about 1.5 in. on one side and about 0.5 in. on the other side). Compared to the stackup of FIG. 1C, this arrangement will place more paperboard material (two layers rather than one in FIG. 1C) proximate the end of each leg 22A, 22B.

FIG. 1E illustrates another alternative stackup to that shown in FIG. 1C. Rather than the two second plies 12A, 12B in FIG. 1C, the illustrated stackup includes two plies 24A, 24B having a width less than the width Y of the second plies 12A, 12B but greater than the first width X (of the ply 8A). As shown in FIG. 1C, the plies 24A, 24B are staggered such that the total width is approximately equal to the width Y of a second ply 12. Each ply 24A, 24B wraps around one end of the ply 8A by about the same amount as a centered ply 12 (see FIG. 1A). The two shorter plies 24A, 24B may be substituted for a longer ply 12.

FIGS. 2A-2B illustrate another packaging structure 4 (e.g., another corner board 4) formed of different numbers of plies 8, 12, 16 to have a different configuration (e.g., a corner board 4 with a different caliper thickness (about 0.120 in.)). The illustrated corner board 4 has two first plies 8A, 8B, two second plies 12A, 12B, and two third plies 16A, 16B.

FIGS. 3A-3B illustrate yet another packaging structure 4 (e.g., another corner board 4) formed of different numbers of plies 8, 12, 16 to have a different configuration (e.g., a corner board 4 with a different caliper thickness (about 0.140 in.)). The illustrated corner board 4 has three first plies 8A-8C, two second plies 12A, 12B, and two third plies 16A, 16B.

FIGS. 4A-4B illustrate a further packaging structure 4 (e.g., another corner board 4) formed of different numbers of plies 8, 12, 16 to have a different configuration (e.g., a corner board 4 with a different caliper thickness (about 0.160 in.)). The illustrated corner board 4 has four first plies 8A-8D, two second plies 12A, 12B, and two third plies 16A, 16B. As shown in FIG. 4B, the corner board 4 includes twelve (12) layers at the apex 20, twelve (12) layers proximate the end of each leg 22A, 22B, and ten (10) layers on the intermediate portion of the legs 22A, 22B.

Figure 5A:
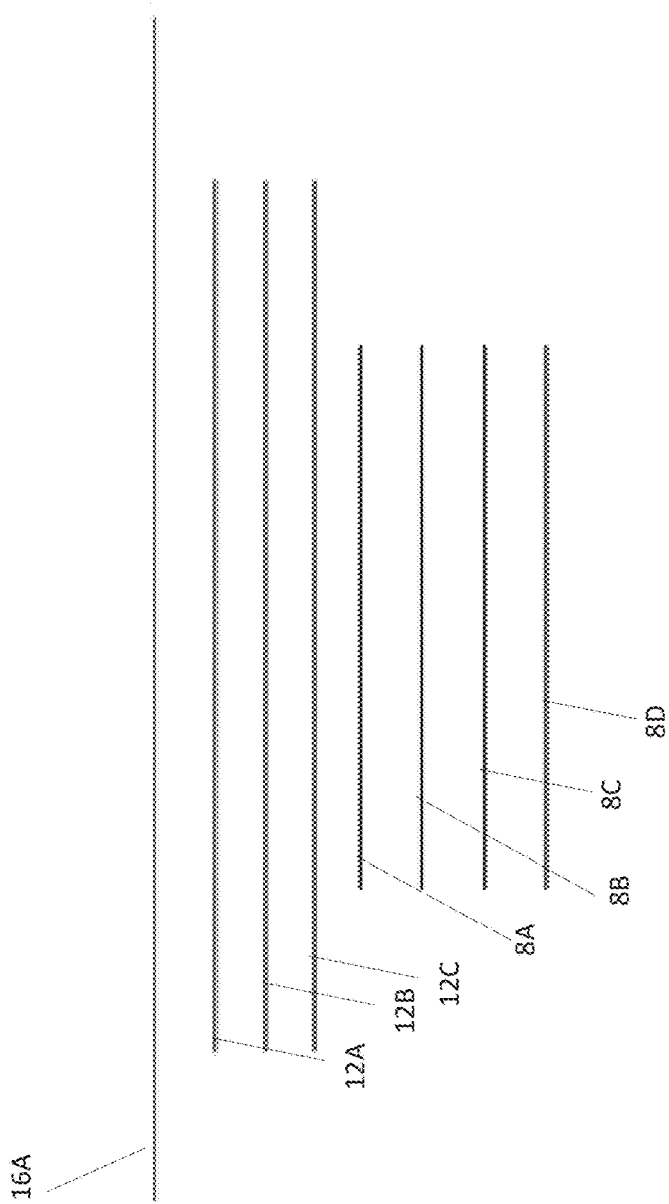

FIGS. 5A-5B illustrate a packaging structure 4 similar to that shown in FIGS. 4A-4B having substantially the same configuration (e.g., a corner board 4 with a caliper thickness (about in.)) but formed of different numbers of plies 8, 12, 16. The illustrated corner board 4 has four first plies 8A-8D, three second plies 12A-12C, and one third ply 16A. As shown in FIG. the corner board 4 includes ten (10) layers at the apex 20 (two fewer than in FIG. 4B), twelve (12) layers proximate the end of each leg 22A, 22B, and nine (9) layers on the intermediate portion of the legs 22A, 22B (one fewer than in FIG. 4B).

Figure 6B:
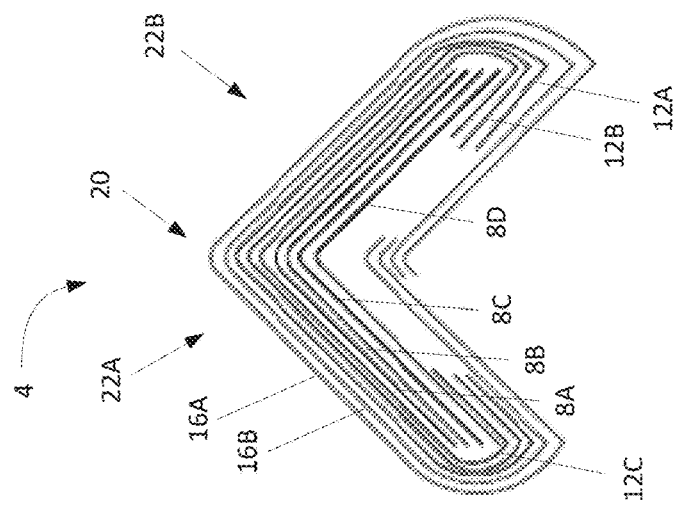
Figure 6A:
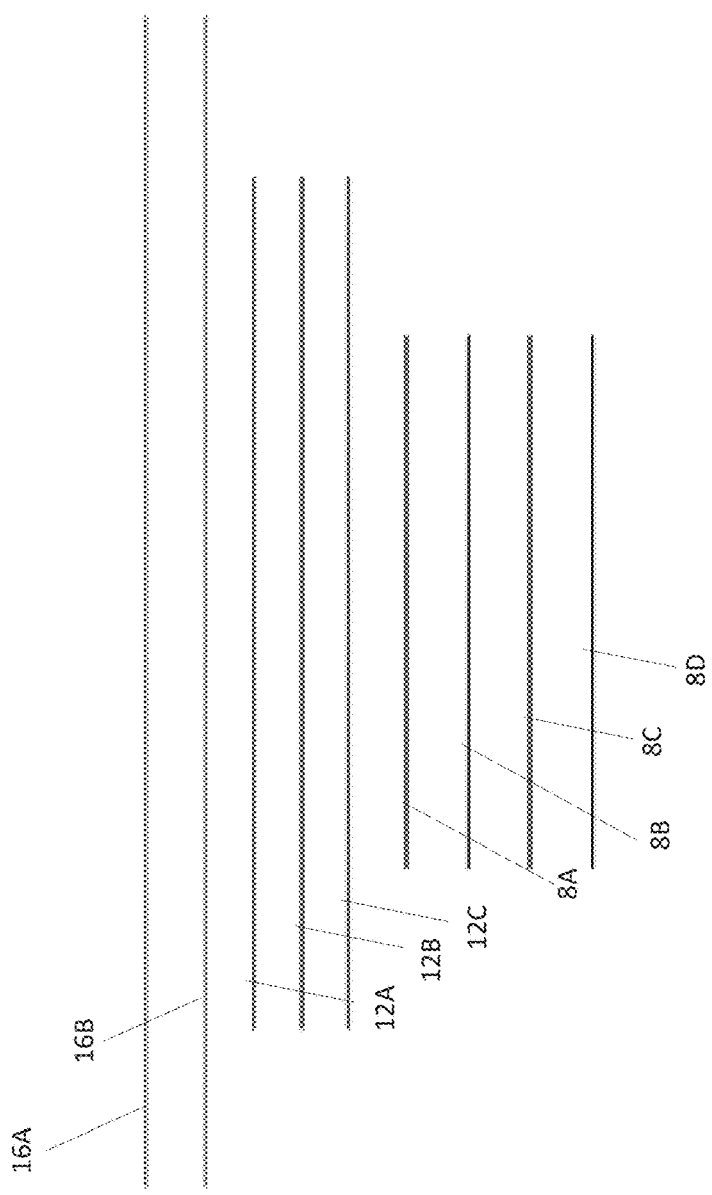

FIGS. 6A-6B illustrate another packaging structure 4 (e.g., another corner board 4) formed of different numbers of plies 8, 12, 16 to have a different configuration (e.g., a corner board 4 with a different caliper thickness (about 0.180 in.)). The illustrated corner board 4 has four first plies 8A-8D, three second plies 12A-12C, and two third plies 16A, 16B.

FIGS. 7A-7B illustrate yet another packaging structure 4 (e.g., another corner board 4) formed of different numbers of plies 8, 12, 16 to have a different configuration (e.g., a corner board 4 with a different caliper thickness (about 0.200 in.)). The illustrated corner board 4 has five first plies 8A-8E, three second plies 12A-12C, and two third plies 16A, 16B.

FIGS. 8A-8B illustrate a further packaging structure 4 (e.g., another corner board 4) formed of different numbers of plies 8, 12, 16 to have a different configuration (e.g., a corner board 4 with a different caliper thickness (about 0.225 in.)). The illustrated corner board 4 has six first plies 8A-8F, three second plies 12A-12C, and two third plies 16A, 16B. As shown in FIG. 8B, the corner board 4 includes fifteen (15) layers at the apex 20, sixteen (16) layers proximate the end of each leg 22A, 22B, and thirteen (13) layers on the intermediate portion of the legs 22A, 22B.

FIGS. 8C-8D illustrate an alternative stackup for the packaging structure 4 shown in FIG. 8A-8B having substantially the same configuration (e.g., a corner board 4 with a caliper thickness (about 0.225 in.)) but formed with different plies and in a different manner. Rather than six first plies 8A-8F and three second plies 12A-12C as shown in FIGS. 8A-8B, the illustrated stackup includes three first plies 8A-8C and six plies 24A-24F having a width less than the width Y of the second plies 12A, 12B but greater than the first width X (of the plies 8A-8C).

As shown in FIG. 8C, the plies 24A-24F are staggered such that the total width is approximately equal to the width Y of a second ply 12. The illustrated plies 24A-24F are arranged in two groups/stacks of staggered plies—plies 24A-24C and plies 24D-24F. Each ply 24A-24F wraps around one end of the plies 8A-8C by about the same amount as a centered ply 12 (see FIG. 1A). Two staggered shorter plies 24 may be substituted for a longer ply 12.

FIGS. 8E-8F illustrate an alternative stackup to that shown in FIGS. 8C-8D having substantially the same configuration (e.g., a corner board 4 with a caliper thickness (about 0.225 in.)) but formed in a different manner. In the stackup of FIG. 8E, the plies 24A-24F are not grouped/stacked (as in FIGS. 8C) but are, instead, intermingled.

Grouped/stacked plies (e.g., plies 24A-24C and plies 24D-24F in FIGS. 8C-8D) may, for example, be easier to guide along the aligned edges (on one or both sides), etc. Intermingled plies (e.g., plies 24A-24F in FIGS. 8E-8F) may, for example, minimize transitions between different layers, provide increased cohesiveness to the packaging structure 4 (by "interweaving" plies of different layers), etc.

FIGS. 8G-8H illustrate an alternative stackup for the packaging structure 4 shown in FIG. 8A-8B having substantially the same configuration (e.g., a corner board 4 with a caliper thickness (about 0.225 in.)) but formed with different plies and in a different manner. Rather than six first plies 8A-8F and three second plies 12A-12C as shown in FIGS. 8A-8B, the illustrated stackup includes nine first plies 8A-8C and 8*a*-8*f*, each having substantially the first width X.

As shown in FIG. 8G, the plies 8A-8C are centered, and the plies 8*a*-8*f* are staggered such that the total width is approximately equal to the width Y of a second ply 12. The illustrated plies 8*a*-8*f* are arranged in two groups/stacks of staggered plies—plies 8*a*-8*c* and plies 8*d*-8*f*. Each ply 8*a*-8*f* wraps around one end of the plies 8A-8C by about the same amount as a centered ply 12 (see FIG. 1A). Two staggered shorter plies 8 may be substituted for a longer ply 12.

FIGS. 8I-8J illustrate an alternative stackup to that shown in FIGS. 8G-8H having substantially the same configuration (e.g., a corner board 4 with a caliper thickness (about 0.225 in.)) but formed in a different manner. In the stackup of FIG. 8I, the plies 8*a*-8*f* are not grouped/stacked (as in FIGS. 8G) but are, instead, intermingled.

FIGS. 9A-9B illustrate a packaging structure 4 similar to that shown in FIGS. 8A-8B having substantially the same configuration (e.g., a corner board 4 with the same caliper thickness (about 0.225 in.)) but formed of different plies 8, 12, 16, 26 and different numbers of plies 8, 12, 16. The illustrated corner board 4 includes a narrow fourth ply 26A having a fourth width less than the first width X. In the illustrated construction, the fourth ply 26A is positioned at the apex 20 and in an intermediate portion of the stackup shown in FIG. 9A (e.g., between the first plies 8A-8E and the second plies 12A-12D).

As shown in FIG. 9B, the corner board 4 includes sixteen (16) layers at the apex 20, seventeen (17) layers proximate the end of each leg 22A, 22B, and thirteen (13) layers on the intermediate portion of the legs 22A, 22B.

Compared to the corner board 4 of FIGS. 8A-8B, the corner board 4 shown in FIGS. 9A-9B has one fewer first ply 8 (five first plies 8A-8E) and one more second ply 12 (four second plies 12A-12D). The additional wrapped second ply 12D and the fourth ply 26A replace the structure of the removed first ply 8F (of FIGS. 8A-8B).

The fourth ply 26A placed at an apex 20 adds caliper to the apex 20 without affecting the remainder of the entire corner board 4, while reducing build cost (compared to a full width ply 8), etc. The combination of narrow ply 26A and the wrapped portions of the second ply 12D uses less paper (e.g., the removal of paper between the ends of the fourth ply 26A and between the ends of the wrapped portion of the ply 12D) compared to a continuous first ply 8F.

Figures 10A, 10B:
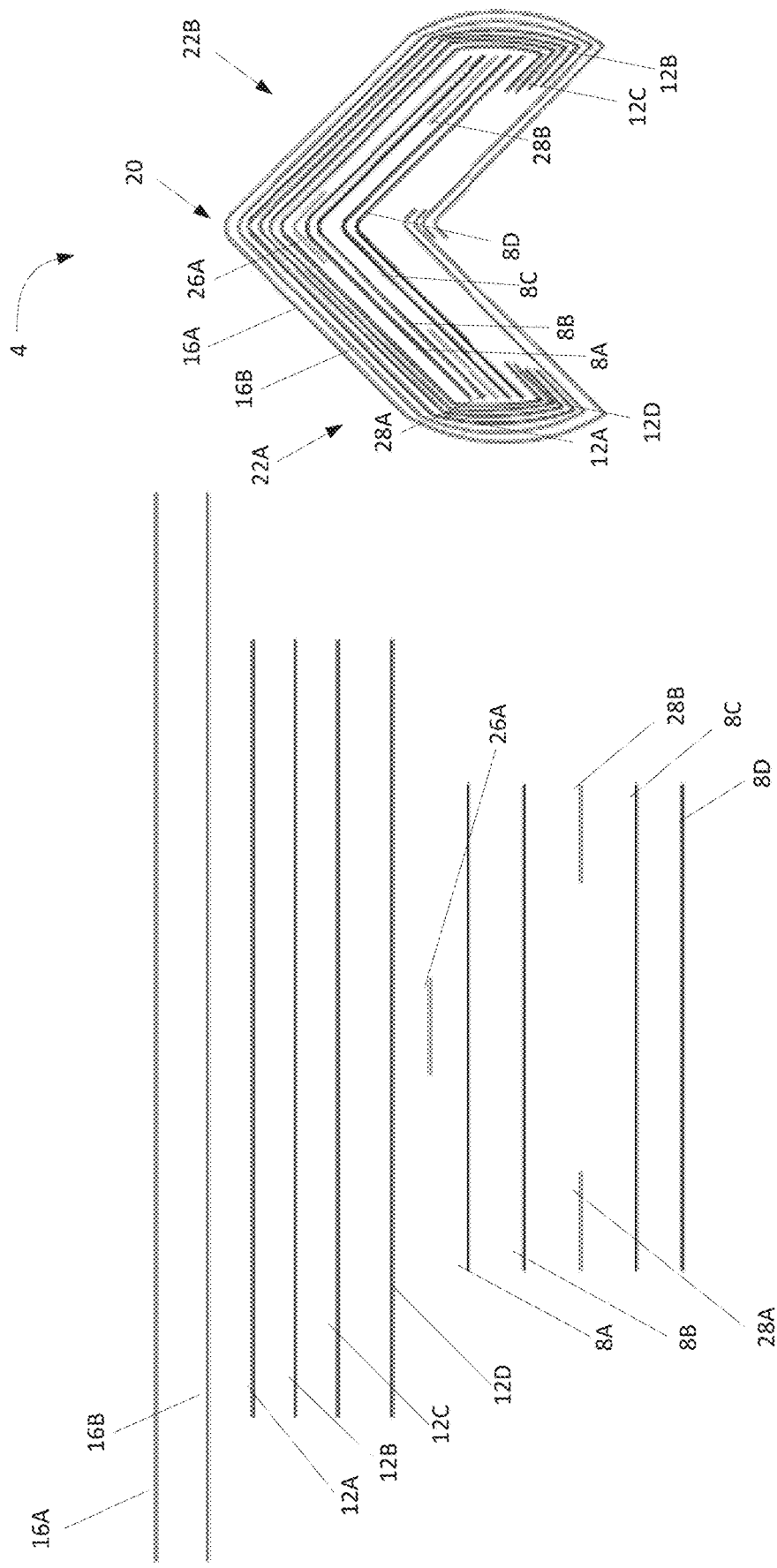

FIGS. 10A-10B illustrate a packaging structure 4 similar to that shown in FIGS. 8A-8B and in FIGS. 9A-9B having substantially the same configuration (e.g., a corner board 4 with the same caliper thickness (about 0.225 in.)) but formed of different plies 8, 12, 16, 26, 28, different numbers of plies 8, 12, 16, 26, 28, plies in different locations, etc. The illustrated corner board 4 also includes the narrow fourth ply 26A positioned at the apex 20.

The illustrated corner board 4 also includes a number (two shown) of narrow fifth plies 28A, 28B having a fifth width less than the first width X. Each illustrated fifth ply 28A, 28B is spaced from the apex 20 along an associated leg 22A, 22B (e.g., proximate each end portion).

As shown in FIG. 10B, the corner board 4 includes fifteen (15) layers at the apex 20, seventeen (17) layers proximate the end of each leg 22A, 22B, and twelve (12) layers on the intermediate portion of the legs 22A, 22B.

Compared to the corner board 4 of FIGS. 9A-9B, the corner board 4 shown in FIGS. 9A-9B has one fewer first ply 8 (four first plies 8A-8D) and the same number of second plies 12 (four second plies 12A-12D). The fourth ply 26A and the fifth plies 28A, 28B replace the structure of the removed first ply 8E (of FIGS. 9A-9B).

The fourth ply 26A placed at an apex 20 adds caliper to the apex 20 without affecting the remainder of the entire corner board 4, while reducing build cost (compared to a full width ply 8), etc. The combination of narrow fourth ply 26A and the narrow fifth plies 28A, 28B uses less paper (e.g., the removal of paper between the ends of the fourth ply 26A and between the ends of the wrapped portion of the ply 12D) compared to a continuous first ply 8E.

It should be understood that the different constructions illustrated among FIGS. 8-10 (and between FIGS. 4 and 5) may be applied to the other packaging structures 4 described in the application and illustrated in the figures.

FIGS. 11A-11B illustrate a further packaging structure 4 (e.g., another corner board 4) formed of different numbers of plies 8, 12, 16 to have a different configuration (e.g., a corner board 4 with a different caliper thickness (about 0.250 in.)). The illustrated corner board 4 has seven first plies 8A-8G, four second plies 12A-12D, and two third plies 16A, 16B.

Figures 12A, 12B, 12C, 12D, 12E:
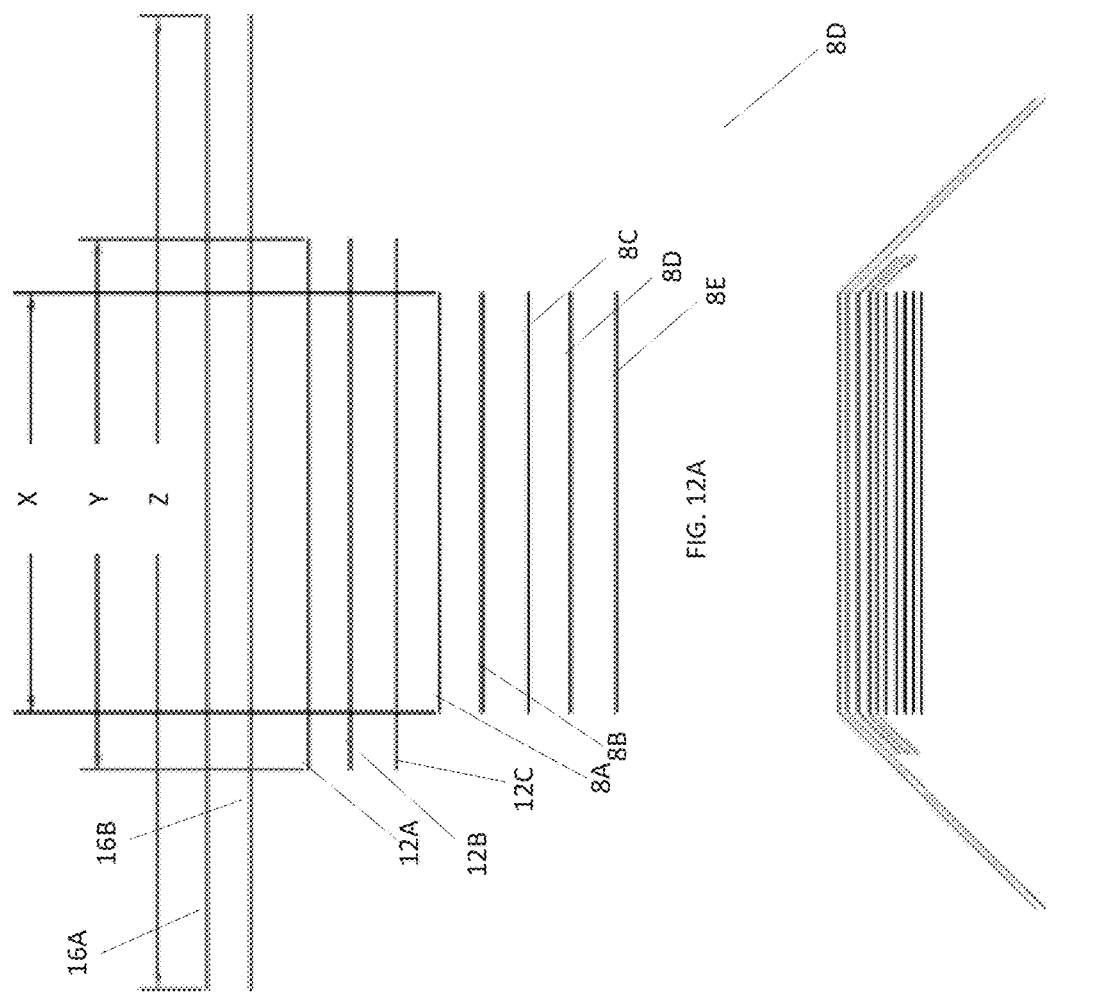
FIGS. 12A-12E are schematic diagrams of a method of manufacturing a packaging structure, such as an example corner board structure.

FIGS. 12A-12E illustrate a method of manufacturing a packaging structure 4, such as the corner board 4 illustrated in FIGS. 7A-7B. FIG. 12A illustrates the stackup of plies 8, 12, 16 arranged to form the corner board 4. Adhesive (e.g., glue) is applied to retain the plies 8, 12, 16 in the illustrated stackup. For example, glue is applied to the inner surface of plies 8, 12, 16. The plies 8, 12, 16 are pressed together as a unitary structure, and the adhesive cures. The structure is substantially flat as shown in FIG. 12A.

In different constructions and based upon the packaging structure 4 (e.g., manufacturing method, use, etc.), the adhesive (e.g., glue) may be applied at different locations to the plies 8, 12, 16, etc. For example, the adhesive may be applied to certain plies and not to the other(s). Additionally or alternatively, the adhesive may be discontinuous along a ply—applied proximate the end portions (e.g., the overlapping ends of an outer ply 16, the wrapped ends of an intermediate ply 12, etc.), not applied to intermediate portions (e.g., along portions of the leg(s) 22), applied to other intermediate portions (e.g., proximate the apex 20, other portions of the leg(s)).

Various types of adhesive (e.g., glue) may be used in the packaging structure 4. The type and location of the adhesive may be selected based on desired characteristics (e.g., adhesion, strength, waterproofness, etc.). For example, adhesive having improved adhesion, strength, etc. may be used on the overlapping ends of an outer ply 16, at the wrapped ends of a ply 12, proximate the apex 20, etc. Adhesive having improved waterproofness may be used on surfaces which may be exposed to moisture or fluid (e.g., outer surfaces of the packaging structure 4).

After the plies 8, 12, 16 are adhered, wider plies (e.g., plies having a width wider than the width X of the ply or plies which are not wrapped (the first plies 8A-8E), extending beyond at least one end of the ply or plies which are not wrapped (again, the first plies 8A-8E), etc.) are wrapped. To wrap the wider plies 12, 16, the paperboard structure moves along a manufacturing line with the wider plies 12, 16 engaging and being wrapped by stationary guides (e.g., tapered channel members).

In the illustrated example, the second plies 12 wrap around the opposite ends of the first plies 8, and the third plies 16 wrap around the wrapped second plies 12 and the first plies 8. The outer plies 16 overlap at a portion (e.g., at the apex 20) of the corner board 4 while the narrower intermediate plies 12 only wraps around portions of the legs 22A, 22B. Glue on the facing surface of the wrapped plies 12, 16 (and on inner surface of the innermost first ply 8E, if applied) adheres the wrapped portions.

FIGS. 12B-12D illustrate wrapping of the wider plies 12, 16. FIGS. 12B and 12C illustrate intermediate stages of wrapping. FIG. 12D illustrates the paperboard structure after the wider plies 12, 16 are wrapped around the first plies 8A-8E with the third plies 16 overlapping (e.g., proximate the apex 20). At this stage, the paperboard structure is a substantially flat, unitary structure.

FIG. 12E illustrates bending (e.g., folding) of the paperboard structure to produce the corner board 4. In the illustrated construction, the paperboard structure is folded at an apex 20 (e.g., where the third plies 16 overlap) of the structure forming the legs 22A, 22B of the corner board 4.

It should be understood that other packaging structures 4 (e.g., illustrated in FIGS. 1-6 and 8-11) may be formed in accordance with the method described with respect to FIGS. 12A-12E.

Figure 13B:
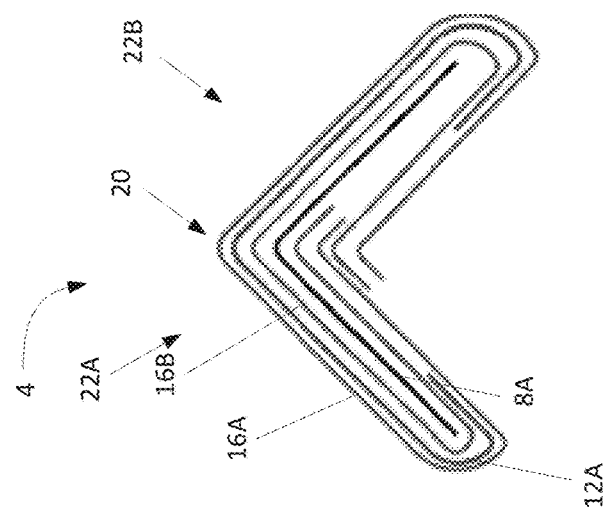
Figure 13A:
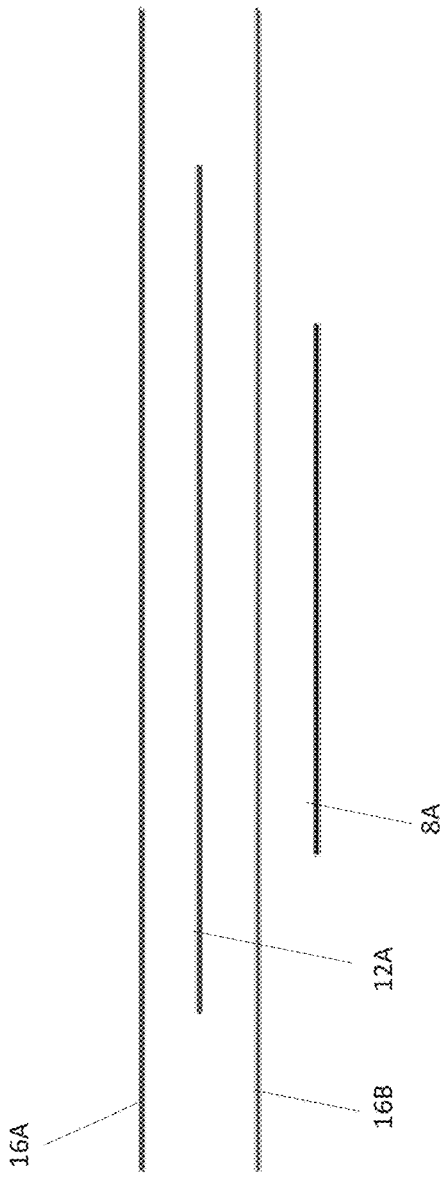

FIGS. 13A-13B illustrate an alternative stackup of the packaging 4 shown in FIGS. 1A-1B having substantially the same configuration (e.g., a corner board 4 with a caliper thickness (about 0.090 in.)) but formed in a different manner. In the stackup of FIGS. 13A-13B, the plies 8, 12, 16 are not grouped/stacked by width (as in FIGS. 1A-1B) but are, instead, intermingled. The corner board 4 of FIGS. 13A-13B includes the same plies as the corner board 4 in FIGS. 1A-1B, arranged in a different order.

Figure 14B:
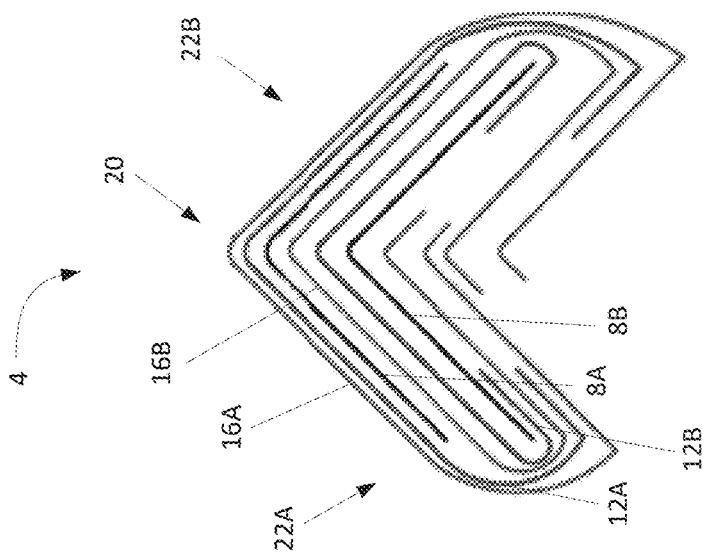
Figure 14A:
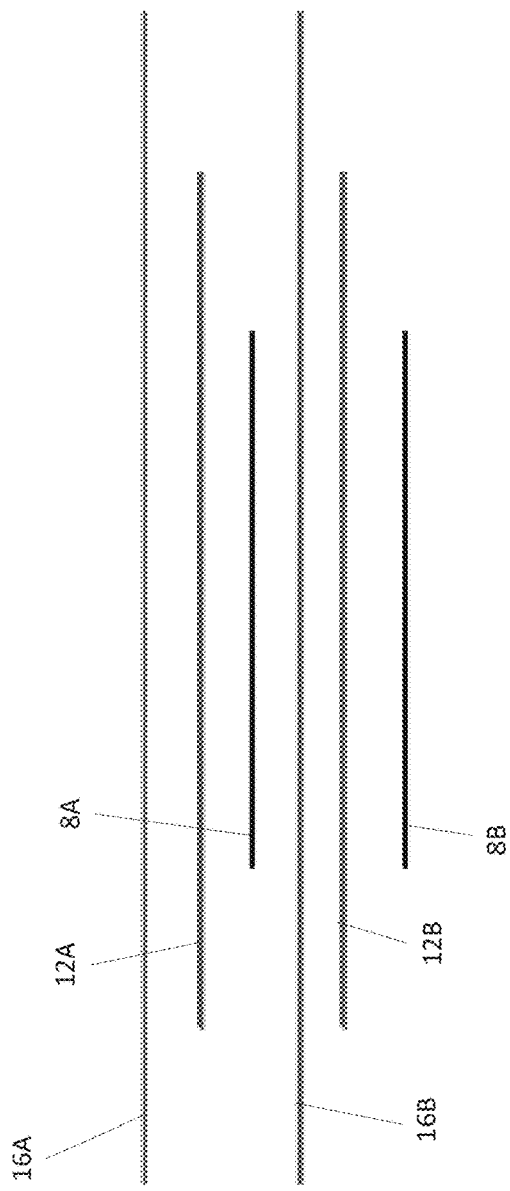

FIGS. 14A-14B illustrate an alternative stackup of the packaging 4 shown in FIGS. 2A-2B having substantially the same configuration (e.g., a corner board 4 with a caliper thickness (about 0.120 in.)) but formed in a different manner (with the plies 8, 12, 16 arranged in a different order).

FIGS. 15A-15B illustrate an alternative stackup of the packaging 4 shown in FIGS. 3A-3B having substantially the same configuration (e.g., a corner board 4 with a caliper thickness (about 0.140 in.)) but formed in a different manner (with the plies 8, 12, 16 arranged in a different order).

Figure 16B:
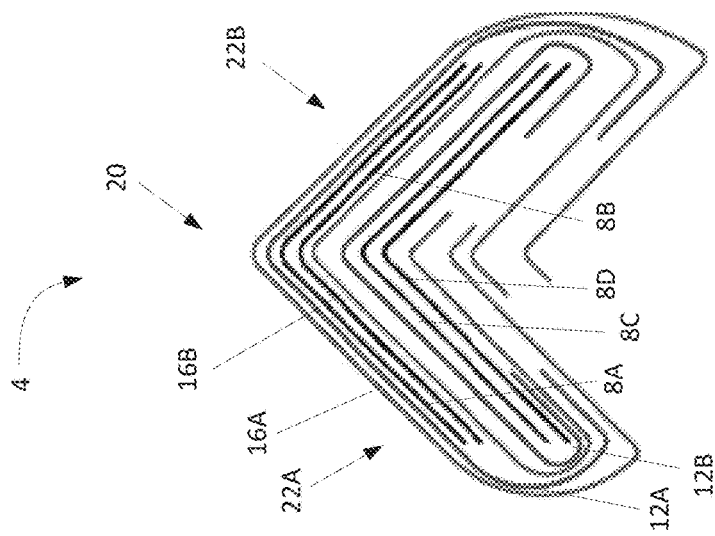
Figure 16A:
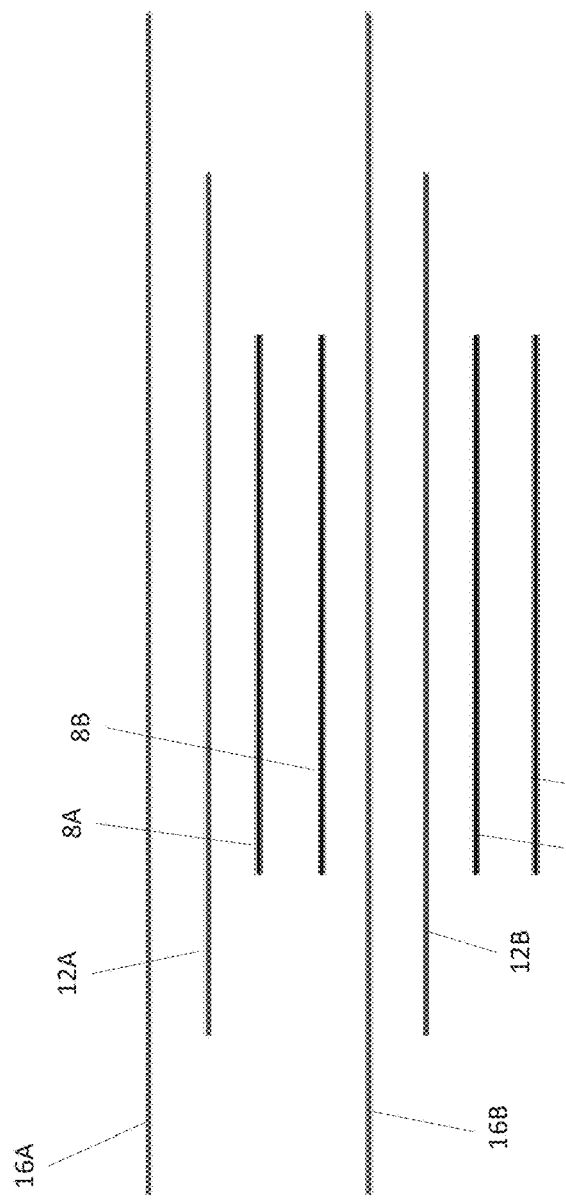

FIGS. 16A-16B illustrate an alternative stackup of the packaging 4 shown in FIGS. 4A-4B having substantially the same configuration (e.g., a corner board 4 with a caliper thickness (about 0.160 in.)) but formed in a different manner (with the plies 8, 12, 16 arranged in a different order).

Figure 17B:
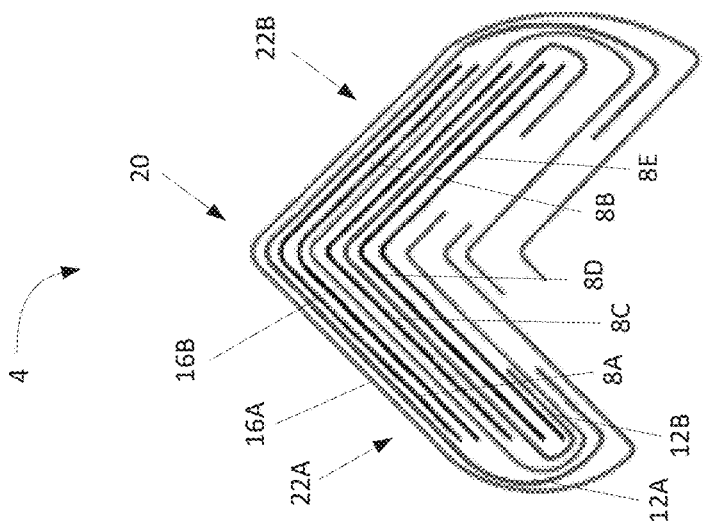
Figure 17A:
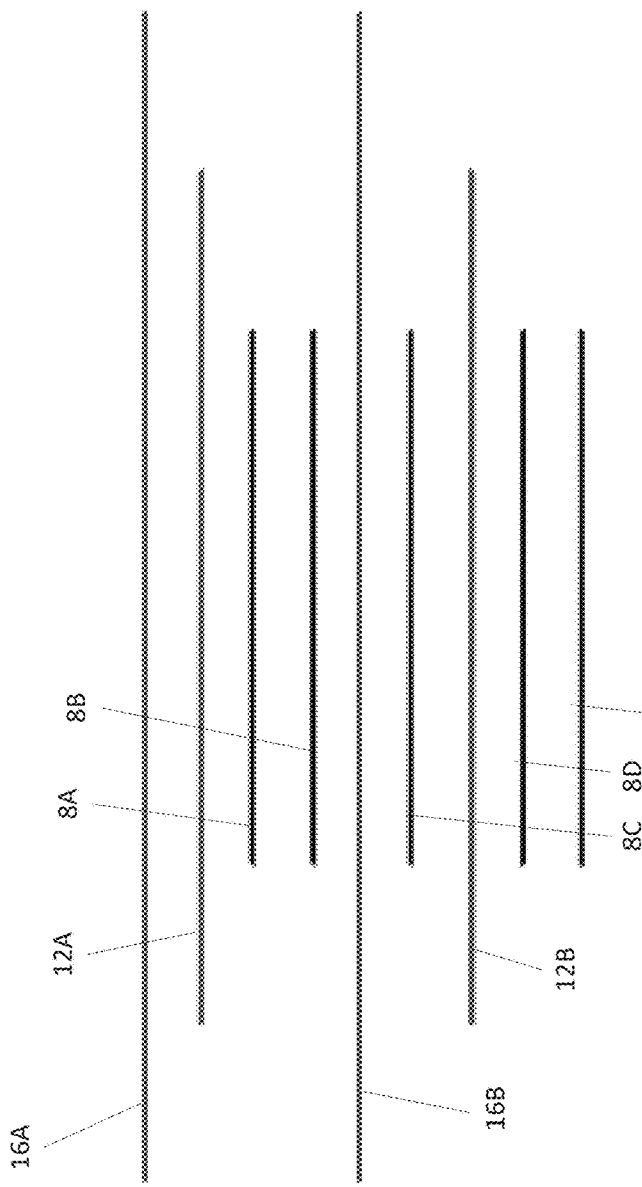

FIGS. 17A-17B illustrate an alternative stackup of the packaging 4 similar to that shown in FIGS. 16A-16B with an additional first layer 8 to provide a different caliper thickness (about 0.180 in.)).

Figure 18B:
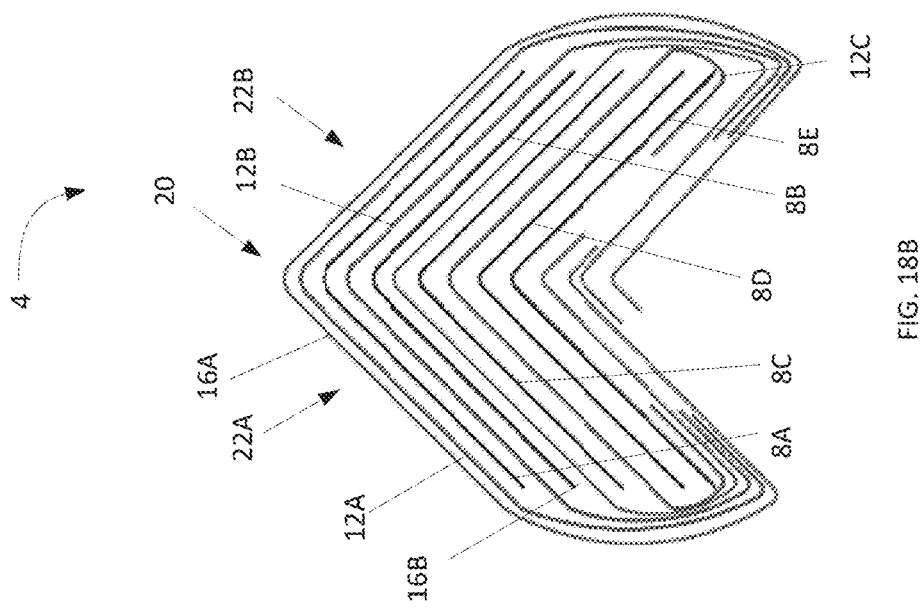
Figure 18A:
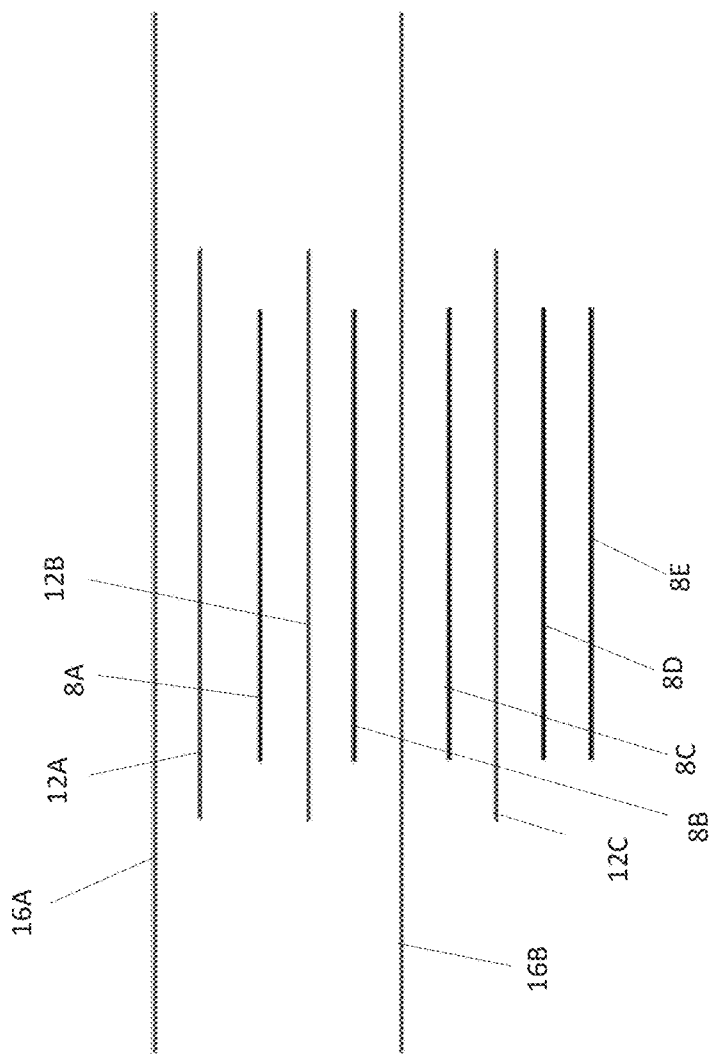

FIGS. 18A-18B illustrate an alternative stackup of the packaging 4 shown in FIGS. 7A-7B having substantially the same configuration (e.g., a corner board 4 with a caliper thickness (about 0.200 in.)) but formed in a different manner (with the plies 8, 12, 16 arranged in a different order).

Figure 19B:
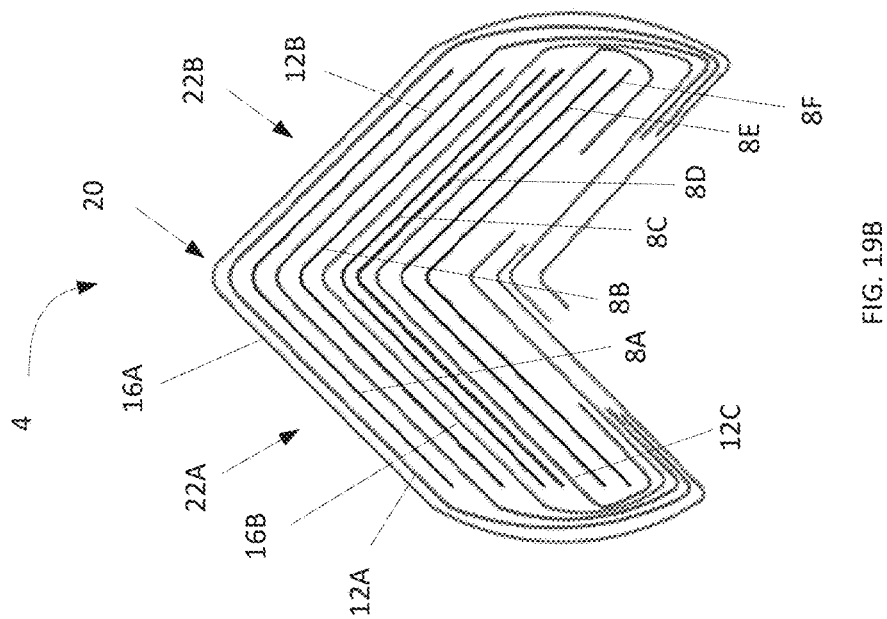
Figure 19A:
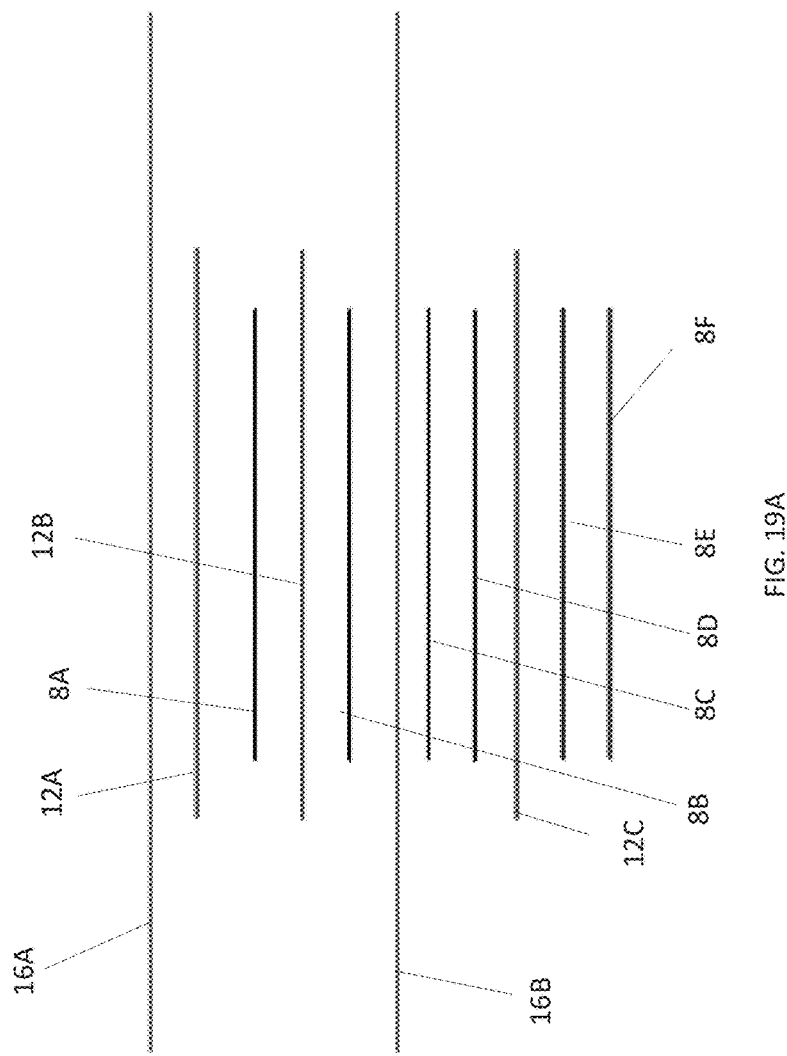

FIGS. 19A-19B illustrate an alternative stackup of the packaging 4 shown in FIGS. 8A-8B having substantially the same configuration (e.g., a corner board 4 with a caliper thickness (about 0.225 in.)) but formed in a different manner (with the plies 8, 12, 16 arranged in a different order).

Figure 20B:
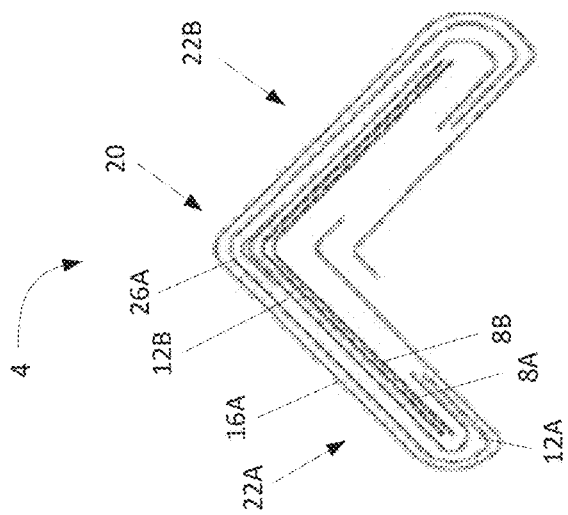
Figure 20A:
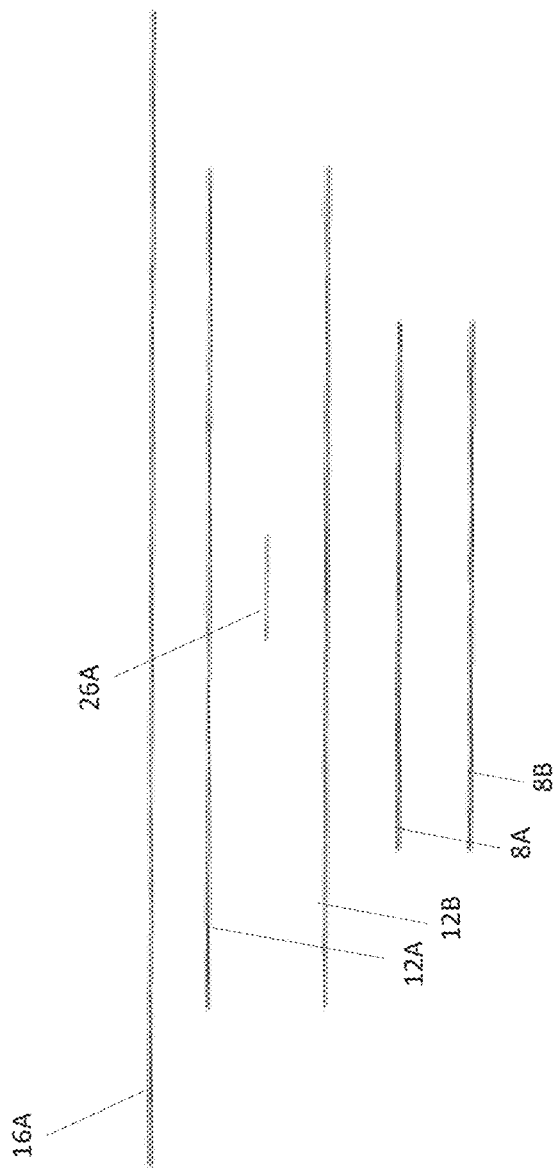

FIGS. 20A-20B illustrate an alternative stackup of the packaging 4 shown in FIGS. 1A-1B having substantially the same configuration (e.g., a corner board 4 with a caliper thickness (about 0.090 in.)) but formed of different plies 8, 12, 16, 26 and different numbers of plies 8, 12, 16. The stackup of FIGS. 20A-20B includes two first plies 8A, 8B, two second plies 12A, 12B, one third ply 16A, and one fourth ply 26A. The illustrated fourth ply 26 is positioned at the apex 20 and between the second plies 12A, 12B.

Figure 21B:
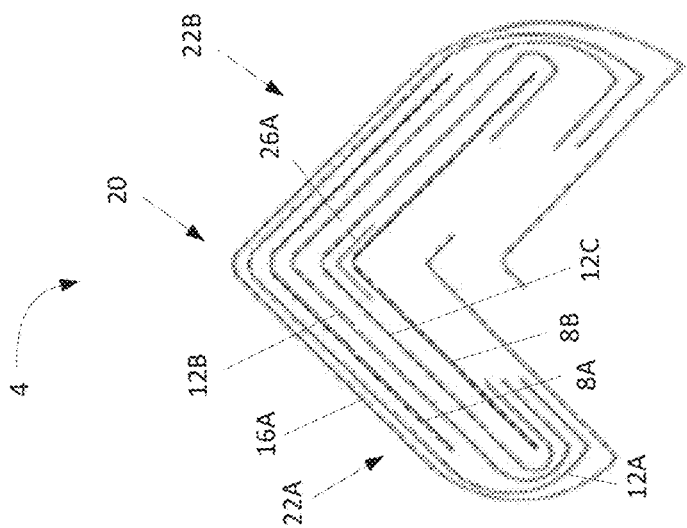
Figure 21A:
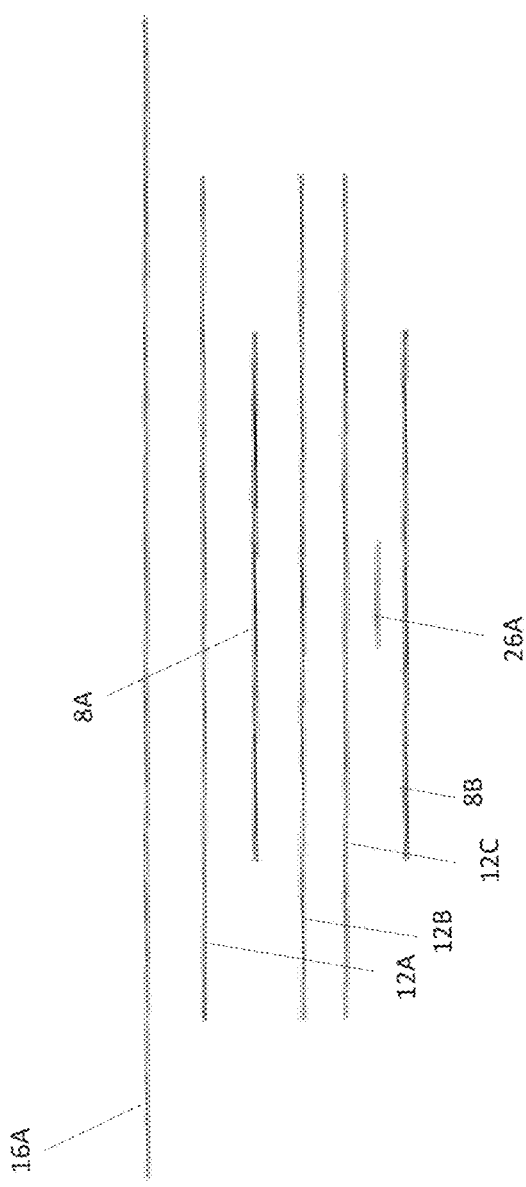

FIGS. 21A-21B illustrate an alternative stackup of the packaging 4 shown in FIGS. 2A-2B and 14A-14B having substantially the same configuration (e.g., a corner board 4 with a caliper thickness (about 0.120 in.)) but formed of different plies 8, 12, 16, 26 and different numbers of plies 8, 12, 16. The stackup of FIGS. 21A-21B includes two first plies 8A, 8B, three second plies 12A-12C, one third ply 16A, and one fourth ply 26A. The illustrated fourth ply 26 is positioned at the apex 20 and among the first plies 8A, 8B and the second plies 12A-12C.

Figure 22B:
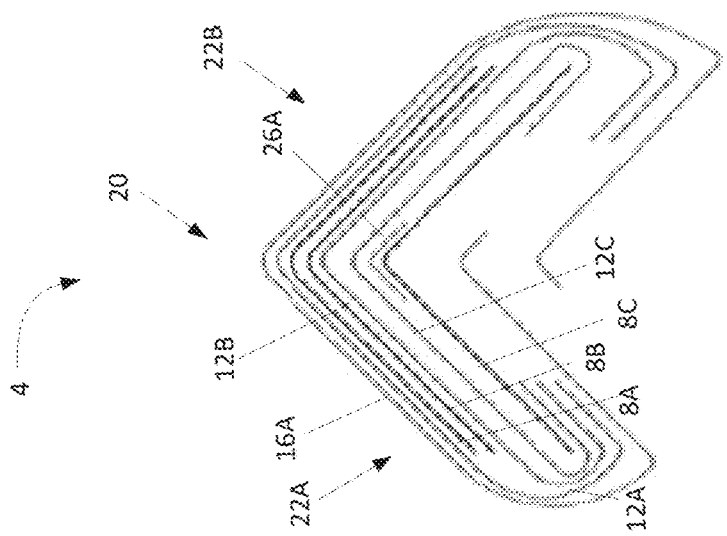
Figure 22A:
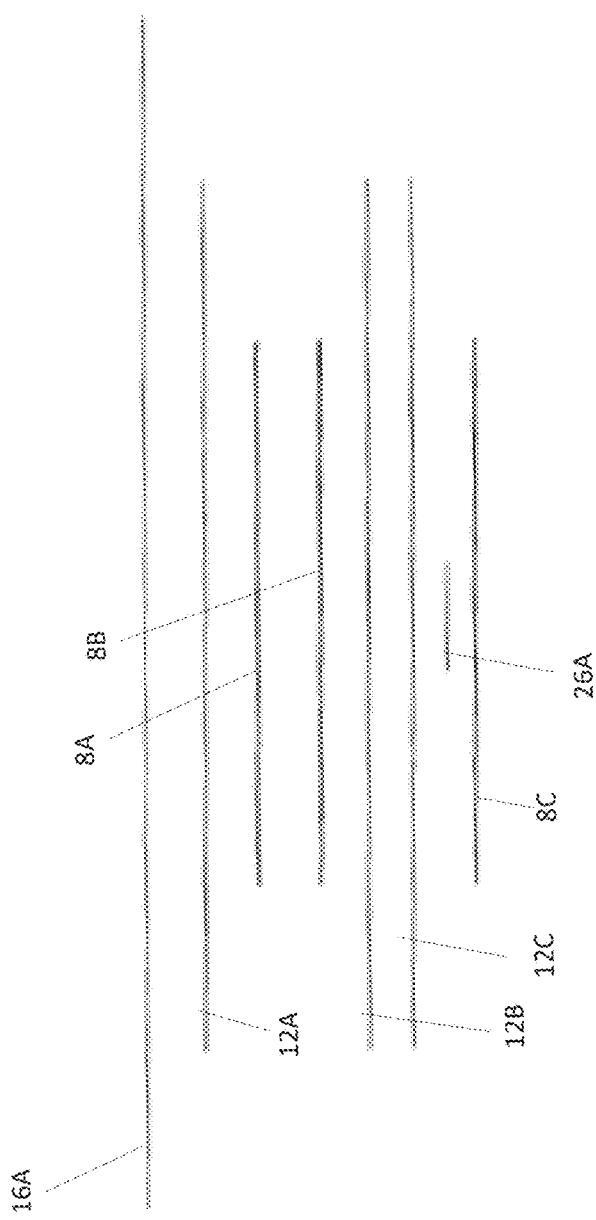

FIGS. 22A-22B illustrate an alternative stackup of the packaging 4 shown in FIGS. 3A-3B and 15A-15B having substantially the same configuration (e.g., a corner board 4 with a caliper thickness (about 0.140 in.)) but formed of different plies 8, 12, 16, 26 and different numbers of plies 8, 12, 16. The stackup of FIGS. 22A-22B includes three first plies 8A-8C, three second plies 12A-12C, one third ply 16A, and one fourth ply 26A. The illustrated fourth ply 26 is positioned at the apex 20 and among the first plies 8A-8C and the second plies 12A-12C.

Figure 23B:
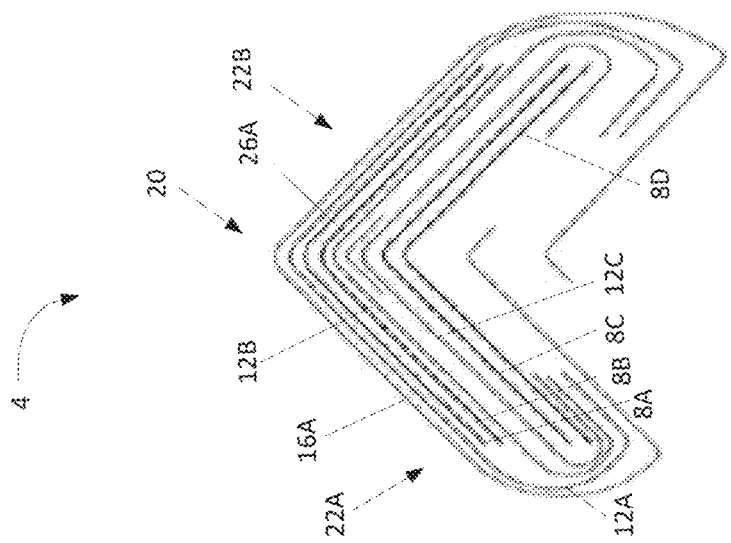
Figure 23A:
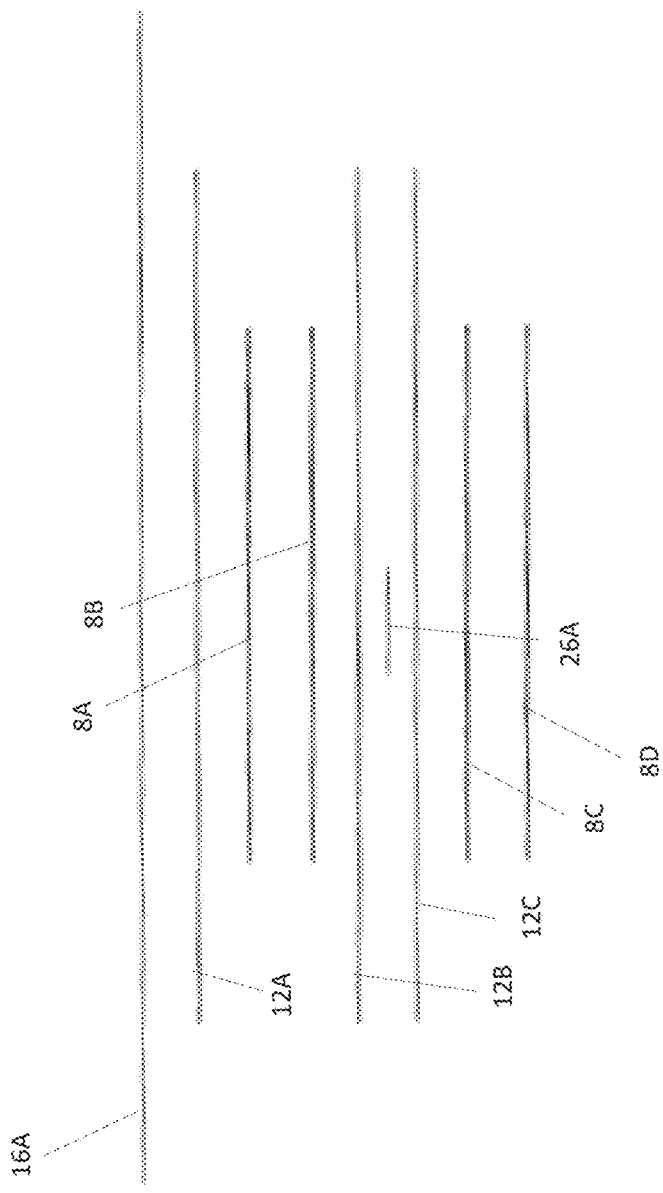

FIGS. 23A-23B illustrate an alternative stackup of the packaging 4 shown in FIGS. 4A-4B and 16A-16B having substantially the same configuration (e.g., a corner board 4 with a caliper thickness (about 0.160 in.)) but formed of different plies 8, 12, 16, 26 and different numbers of plies 8, 12, 16. The stackup of FIGS. 23A-23B includes four first plies 8A-8D, three second plies 12A-12C, one third ply 16A, and one fourth ply 26A. The illustrated fourth ply 26 is positioned at the apex 20 and among the first plies 8A, 8B and the second plies 12A-12C.

Figure 24B:
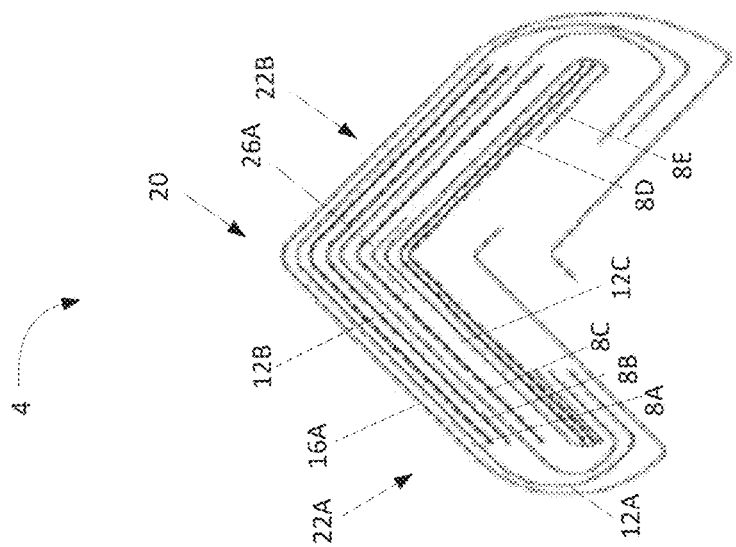
Figure 24A:
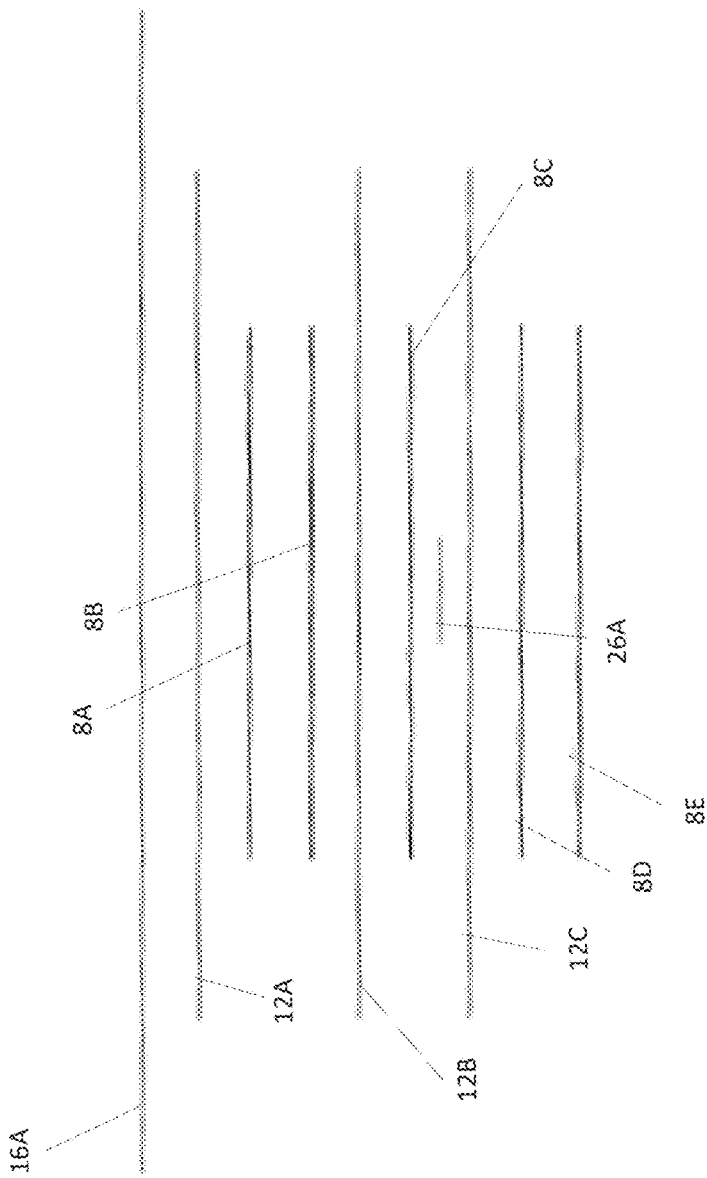

FIGS. 24A-24B illustrate an alternative stackup of the packaging 4 shown in FIGS. 6A-6B and 17A-17B having substantially the same configuration (e.g., a corner board 4 with a caliper thickness (about 0.180 in.)) but formed of different plies 8, 12, 16, 26 and different numbers of plies 8, 12, 16. The stackup of FIGS. 24A-24B includes five first plies 8A-8E, three second plies 12A-12C, one third ply 16A, and one fourth ply 26A. The illustrated fourth ply 26 is positioned at the apex 20 and among the first plies 8A-8E and the second plies 12A-12C.

Figure 25B:
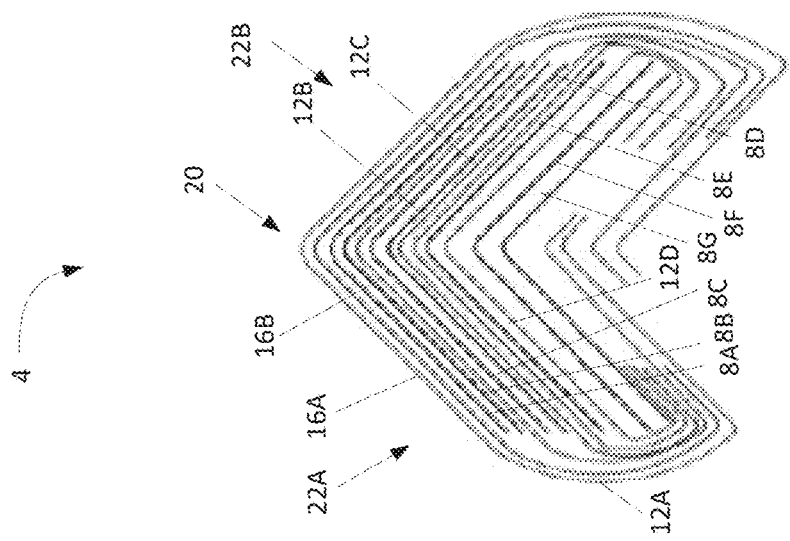
Figure 25A:
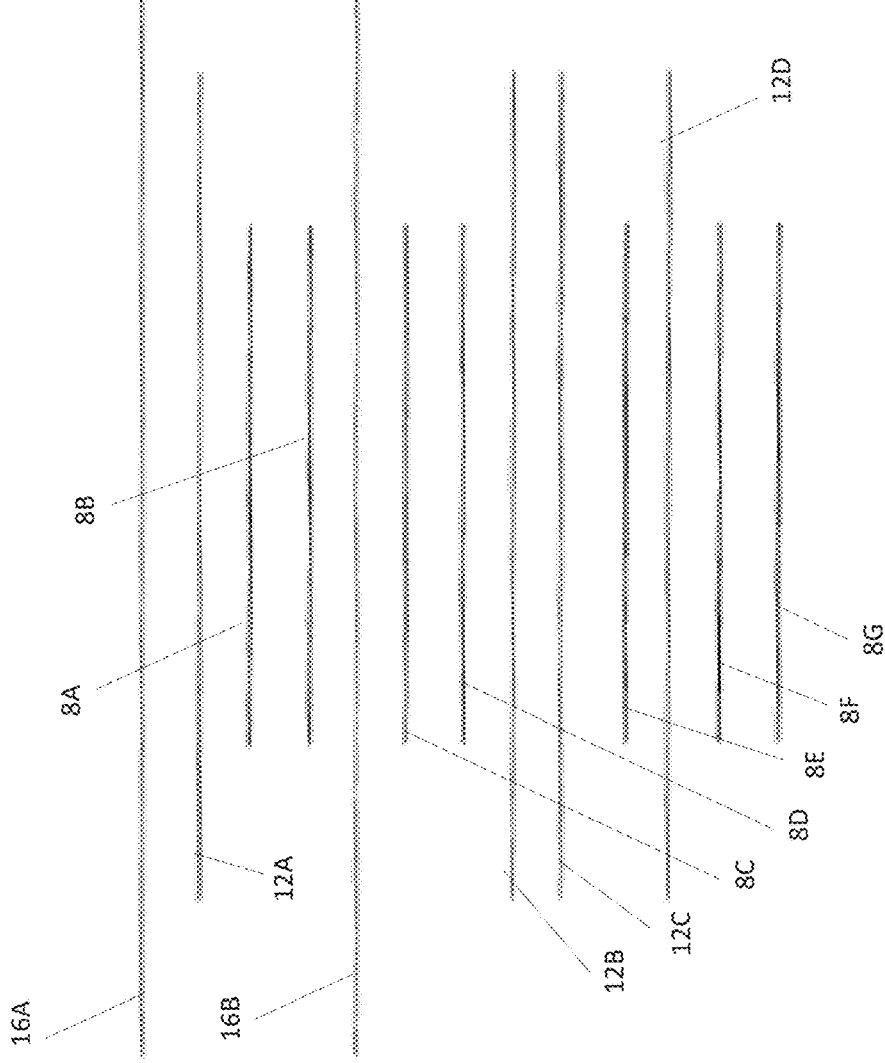

FIGS. 25A-25B illustrate an alternative stackup of the packaging 4 shown in FIGS. 11A-11B having substantially the same configuration (e.g., a corner board 4 with a caliper thickness (about 0.250 in.)) but formed in a different manner (with the plies 8, 12, 16 arranged in a different order). The stackup of FIGS. 25A-25B includes seven first plies 8A-8G, four second plies 12A-12D, and two third plies 16A, 16B.

FIGS. 26A-26B illustrate yet another packaging structure 4 (e.g., another corner board 4) formed of different numbers of plies 12, 16 to have a different configuration. The illustrated corner board 4 has no first plies 8, six second plies 12A-12F, and two third plies 16A, 16B. The ends of the second plies 12A-12F are folded. As illustrated, an adhesive layer 14A-14G and 18A is between each ply 12, 16, respectively. As mentioned above, the type, location, etc. of the adhesive may be selected, for example, based on the manufacturing process for (e.g., the available supply of glue), use of the packaging structure 4.

Figure 27B:
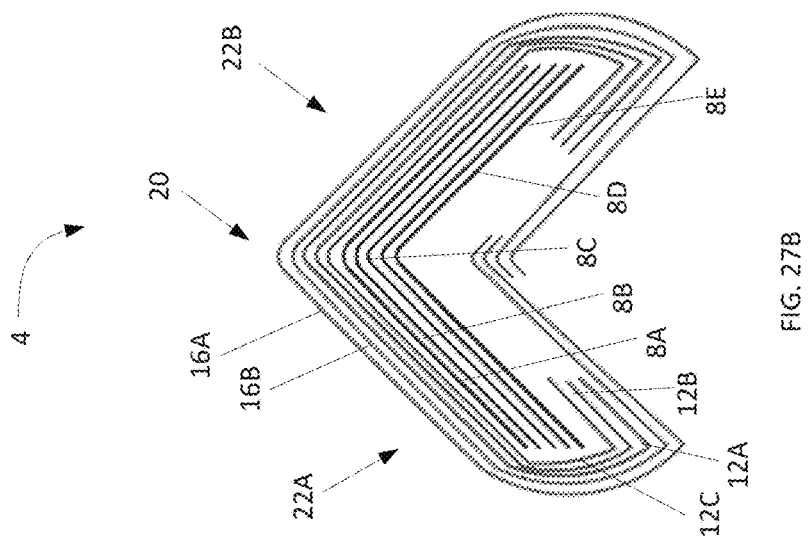
Figure 27A:
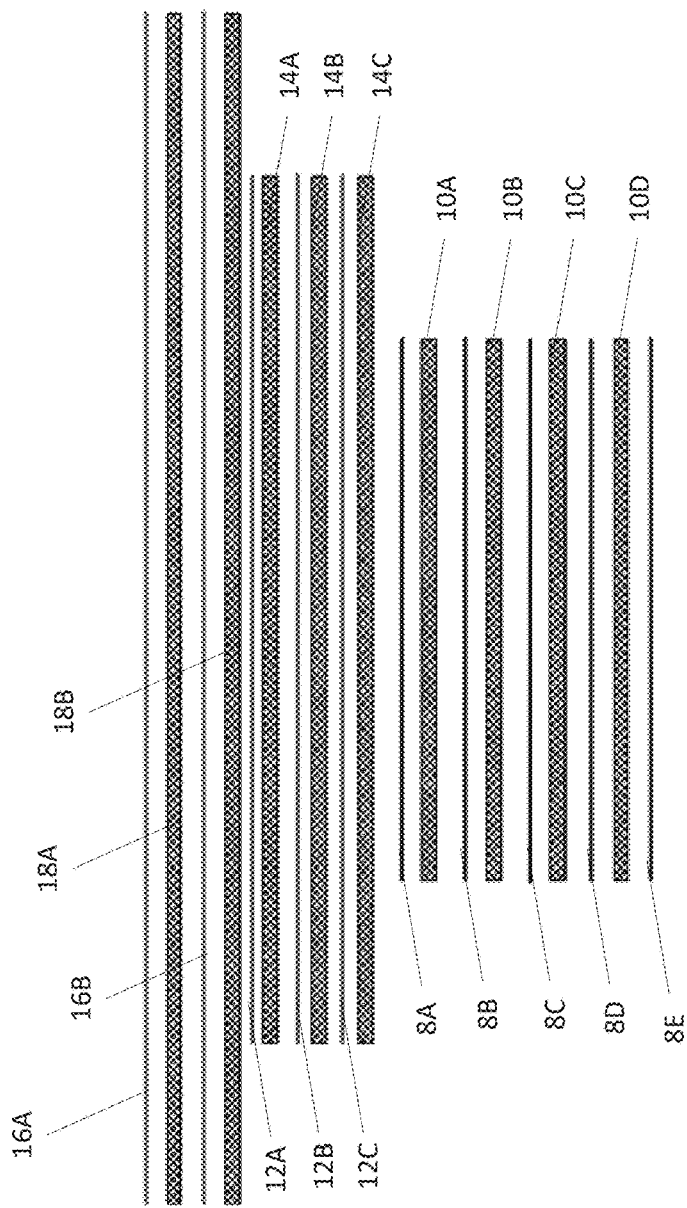

FIGS. 27A-27B illustrate an alternative stackup of the packaging 4 shown in FIGS. 8-10 and 19 having substantially the same configuration (e.g., a corner board 4 with a caliper thickness (about 0.225 in.)) but formed in a different manner (with a different number of the plies 8, 12, 16). The illustrated corner board 4 has five first plies 8A-8E, three second plies 12A-12C, and two third plies 16A, 16B. As illustrated, an adhesive layer 10A-10D, 14A-14C and 18A-18B is between each ply 8, 12, 16, respectively.

FIGS. 28A-28B illustrate yet another packaging structure 4 (e.g., another corner board 4) formed of different numbers and types of plies 12, 16, 26 to have a different configuration. The illustrated corner board 4 has no first plies 8, six second plies 12A-12F, two third plies 16A, 16B, and one fourth ply 26A. The ends of the second plies 12A-12F are folded but, in the illustrated construction, do not wrap around the ply 26A. As illustrated, an adhesive layer 15A, 14A-14E, and 18A-18B is between each ply 26, 12, 16, respectively.

FIGS. 29A-29B illustrate yet another packaging structure 4 (e.g., another corner board 4) formed of different numbers of plies 13, 16 to have a different configuration. In this illustrated example, the plies 13 extending the length of each leg 22A, 22B are folded (e.g., in half). Plies 13 wider than the plies 12 may be selected based on the available paperboard product for manufacturing and folded to provide the desired packaging structure 4.

The illustrated corner board 4 has three sixth plies 13A-13C (folded to have an approximately equivalent caliper thickness of six second plies 12), and two third plies 16A, 16B. The plies are each separated by a layer of glue 18A, 18B, 14A-14E. As illustrated, an adhesive layer 14A-14F and 18A-18B is between each ply 13, 16, respectively.

The plies 13 may be folded and glued in an earlier process or step and supplied in that condition to be wrapped by the outer plies 16A, 16B. Also, while illustrated as being arranged with the folds on one side of the apex 20, in other constructions (not shown), the plies 13 may be arranged with folds on each opposite side of the apex 20 (e.g., alternating, grouped, etc.).

Figure 30:
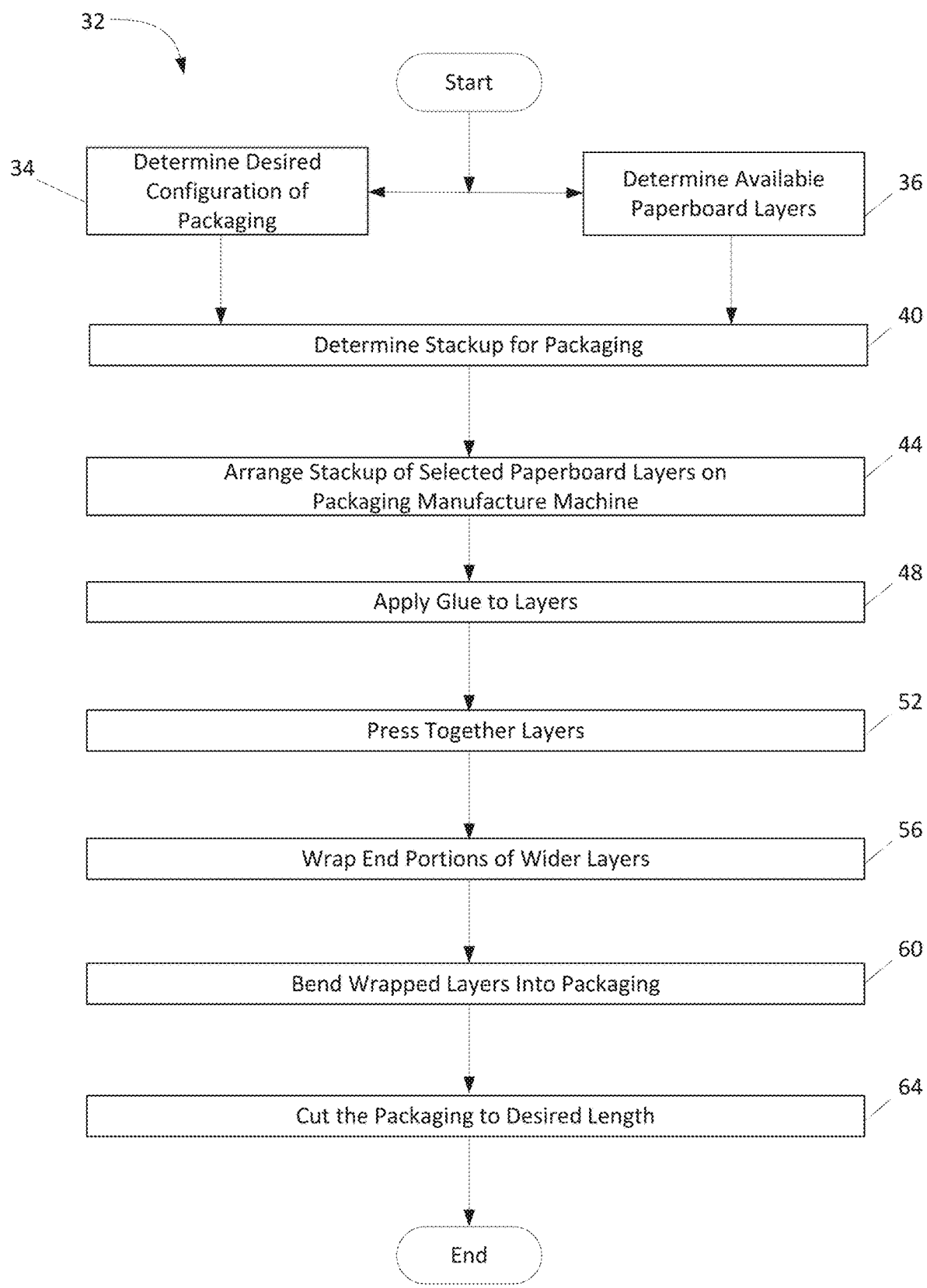
FIG. 30 is a flow chart illustrating a method of manufacturing a packaging structure, which may be performed in part by an electronic processor.

The example packaging structures 4 described above and illustrated in FIGS. 1A-29B may be manufactured in accordance with the method 32 illustrated in FIG. 30. In the example method 32, the desired configuration (e.g., packaging shape (corner board, U-shaped channel, etc.), caliper thickness, locations of plies, etc.) for the packaging structure 4 is determined (e.g., via a customer selection) (block 34). The supply of available paperboard for various plies 8, 12, 13, 16, 24, 26, 28 is determined (block 36).

Based upon at least inputs of the desired configuration and available paperboard supply (on hand, available from suppliers, etc.), the stackup is determined (block 40). In at least some aspects, an electronic processor (not shown) may be used in one or more steps of the method (e.g., receiving a customer input, determining available paperboard supply, determining the stackup, etc.).

The processor includes combinations of hardware and software that are operable to, among other things, configure and control manufacturing of the packaging structure 4. The processor includes a processing unit (e.g., a microprocessor, a microcontroller, or another suitable programmable device), non-transitory computer-readable media, and an input/output interface. The processing unit, the media, and the input/output interface are connected by one or more control and/or data buses. The computer-readable media stores program instructions and data. The processing unit is configured to retrieve instructions from the media and execute the instructions to perform the control processes and methods described herein.

The input/output interface transmits data from the processor to external systems, networks, and/or devices and receives data from external systems, networks, and/or devices. The input/output interface stores data received from external sources to the media and/or provides the data to the processing unit.

As described above, there are numerous arrangements of plies of different dimensions to provide a selected configuration for the selected packaging structure 4. For example, if more paperboard plies 8 of the first width X are available, the corner board 4 may be made of a larger number of first plies 8 than second or third plies 12, 16, or vice versa.

At block 44, the stackup for the corner board 4 is then arranged on a packaging manufacturing machine (not shown). In the example stackup, the selected paperboard plies 8, 12, 16, 24, 26, 28 may be arranged by width or in any other order (e.g., intermingled). The paperboard plies 8, 12, 16, 24, 26, 28 are fed into a gluing section (not shown) of the machine in which glue is applied to the plies (block 48). After the glue is applied, the paperboard plies 8, 12, 16, 24, 26, 28 are pressed together in a flat paperboard structure (block 52).

Wider plies 12, 16, 24 (e.g., wider than or extending beyond an end of plies 8 that are not wrapped) are wrapped around the unwrapped plies 8 (block 56). The third plies 16 overlap on a portion of the flat paperboard structure (e.g., proximate a center portion). The paperboard structure is then bent (e.g., folded) at an apex 20 in a folding portion (not shown) of the machine to form a first leg 22A and a second leg 22B of the corner board 4 (block 60). The bending portion may bend the structure into a V-shaped corner board (FIG. 31A), an offset v-shaped corner board (FIG. 31B), a U-shaped corner board (FIG. 31C). The corner board 4 is then cut to a desired length by a cutter (not shown) of the machine (block 64).

Figure 31A:
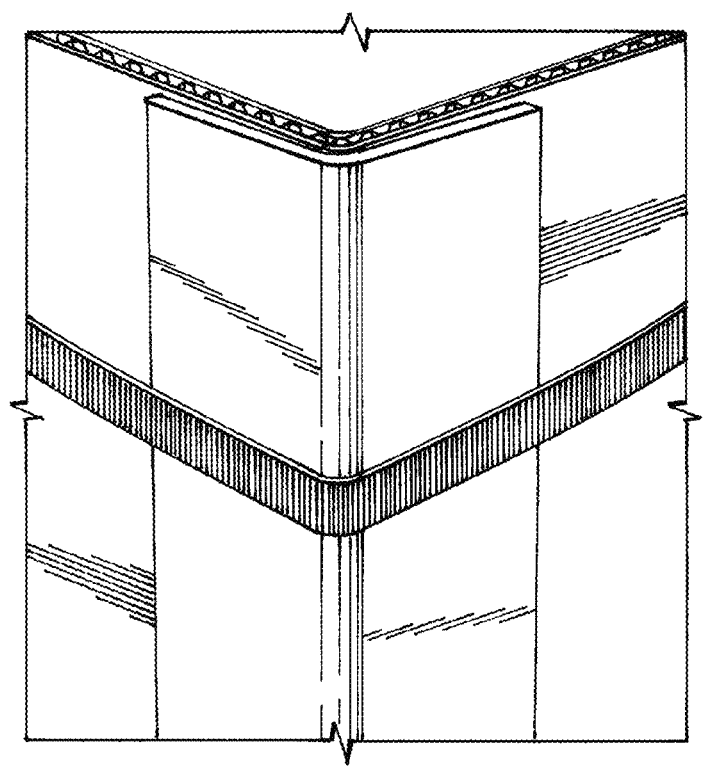
FIGS. 31A-31D illustrate exemplary packaging structures formed by the method.
Figure 31B:
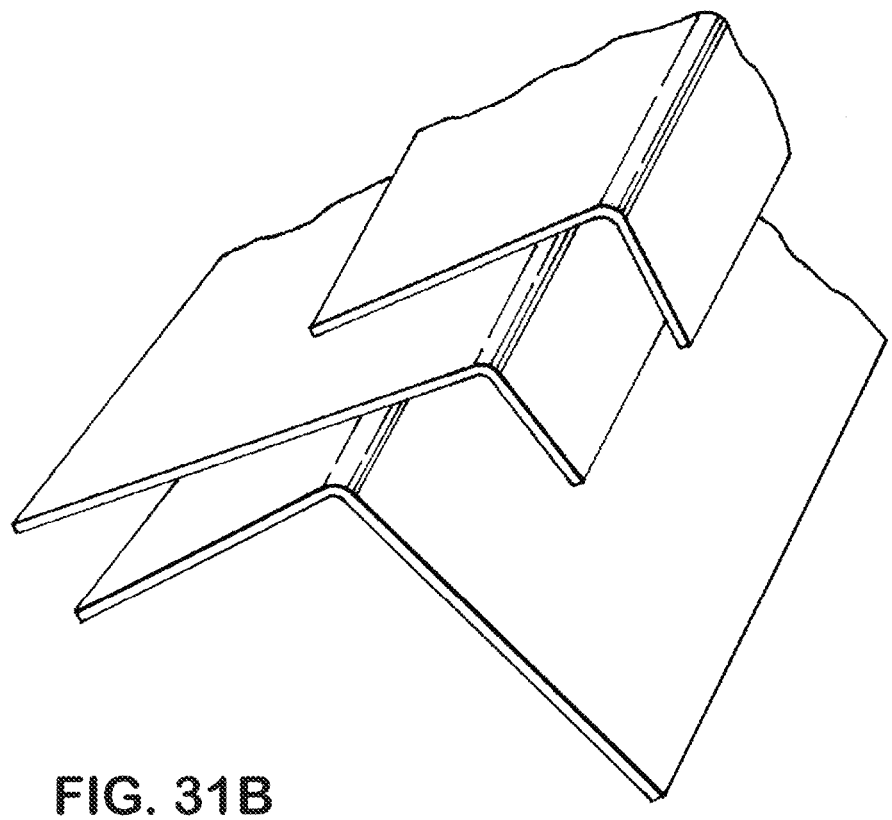
Figure 31C:
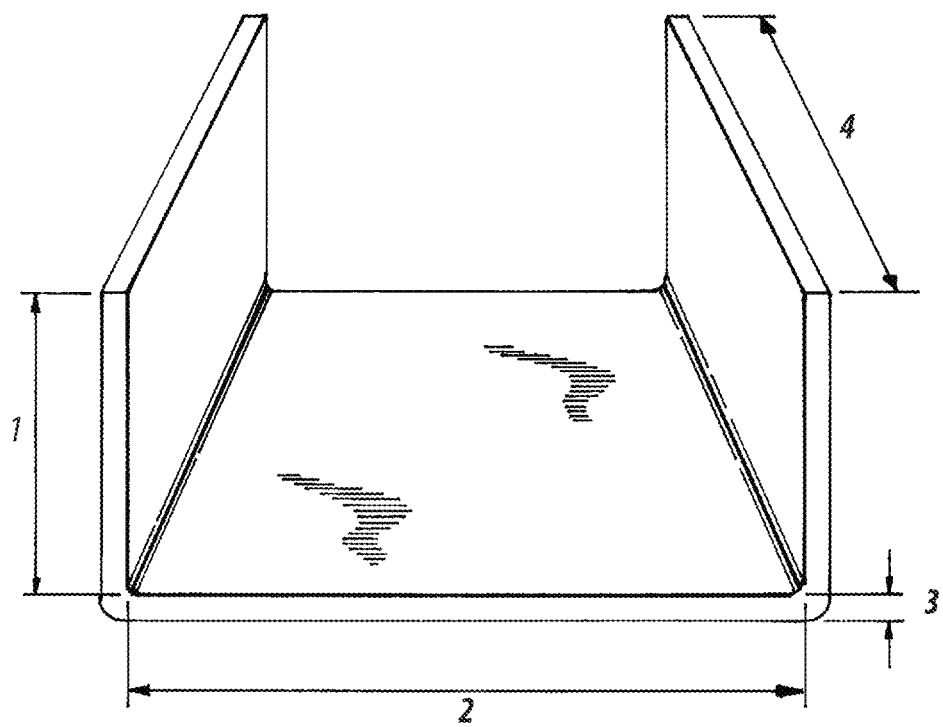

FIG. 31A illustrates a corner board 4 with equal length legs 22A, 22B, and FIG. 31B illustrates corner boards 4 with unequal length legs 22A, 22B, all formed in accordance with embodiments described and illustrated in the figures.

FIG. 31C illustrates a packaging structure 4 including a U-shaped channel. The illustrated U-shaped channel is formed to have two apexes 20, two legs 22, and a base portion. Plies 8, 12, 16, 26, 28 may be arranged to provide the desired structural features. For example, the plies 16A, 16B may overlap at an apex 20 and/or along the base portion.

If overlapping at an apex 20 (or another location offset from the center of the U-shaped channel), the plies 16 may be staggered, rather than centered, to position the overlap. In some constructions, the plies 16 may be aligned to overlap at the same apex 20. In other constructions, each ply 16 may be arranged to overlap at a different apex 20.

Figure 31D:
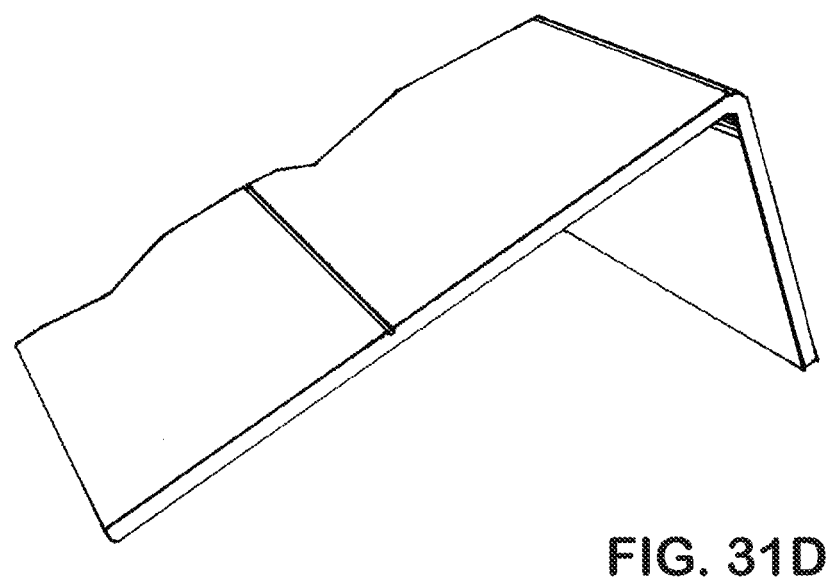

FIG. 31D illustrates a packaging structure 4 formed as a V-shaped channel with offset legs 22A, 22B and one leg being foldable (e.g., along a line of relative weakness) to provide a U-shaped configuration. Plies 8, 12, 16, 24, 26, 28 may be arranged to provide the desired structural features.

For example, plies (e.g., narrow plies 26, 28) may be arranged to remove material at a fold line (e.g., between ends of adjacent plies 26, 28) to facilitate folding. Such a construction may eliminate equipment/processing required to weaken the structure (e.g., to score) at the fold line.

Also, the plies 16 may be arranged to overlap at an apex 20 (or another location offset from the center of the packaging structure 4). To do so, the plies 16 may be staggered, rather than centered, to position the overlap at the off-center apex 20.

The packaging structure 4 may be of any desired size and made with any number of plies, including at least one first ply 8 of a first width X, at least one relatively narrower wrapped ply (e.g., at least one second ply 12 of a second width Y, at least one wrapped first ply 8 of a first width X), and at least one wider wrapped ply (e.g., at least one third ply 16 of a third width Z). In some constructions, the packaging structure 4 may also include at least one fourth ply 26 and/or at least one fifth ply 28. It should be understood that a ply of one type (e.g., generally identified by a width) has substantially the same width as other plies of that "width" type.

The packaging structure 4 may be formed with caliper thickness sizes between about 0.090 in. (or less) to about 0.500 in. (or more). The packaging structure 4 may have, with equal length legs 22A, 22B, leg lengths of between about 1.5 in. (or less) and about 9 in. (or more), and, with unequal length legs 22A, 22B, "offset" leg lengths of, for example, about 1 in. by about 3 in., about 2 in. by about 3 in., about 2 in. by about 4 in., etc. The packaging structure 4 may be formed in lengths of between about 2.5 in. (or less) and about 24 feet (ft.; or more).

Although the invention has been described in detail with reference to certain independent embodiments, variations and modifications exist within the scope and spirit of one or more independent aspects of the invention as described.

One or more independent features and/or independent advantages may be set forth in the following claims:

What is claimed is:

1. A method of manufacturing a packaging structure, the packaging structure including: (i) a first ply having a first end, a second end, and a first width extending between the first end and the second end, (ii) a plurality of second plies including one second ply and another second ply, each second ply having a second width, and (iii) a third ply having a third width, the third width being greater than the first width and greater than the second width, the method comprising:
    adhering the first ply, the one second ply, the another second ply, and the third ply;
    wrapping the one second ply around the first end of the first ply and not the second end of the first ply;
    wrapping the another second ply around the second end of the first ply and not the first end of the first ply;
    wrapping the third ply around the first ply and the plurality of second plies to form a flat paperboard structure of approximately the first width; and
    bending the flat paperboard structure to form the packaging structure.

2. The method of claim 1, wherein the step of adhering includes applying a layer of adhesive on the first ply, the one second ply, the another second ply, and the third ply.

3. The method of claim 1, further comprising, after the step of bending, cutting the packaging structure to a predetermined length.

4. The method of claim 1, wherein the second width is greater than the first width.

5. The method of claim 1, wherein the step of bending forms the packaging structure with an apex and opposite legs extending from the apex, wherein the packaging structure further includes a fourth ply having a fourth width, the fourth width being less than the first width, the fourth ply being positioned along one of the opposite legs and spaced from the apex, the third ply being wrapped around the fourth ply, and wherein the step of wrapping the third ply includes wrapping the third ply around the fourth ply.

6. The method of claim 5, wherein the packaging structure further includes a fifth ply having a fifth width, the fifth width being less than the first width, the fifth ply being positioned across the apex and along a portion of each of the opposite legs, the fourth ply being spaced from the fifth ply along the one of the opposite legs, and wherein the step of wrapping the third ply includes wrapping the third ply around the fifth ply.

7. A method of manufacturing a packaging structure, the method comprising:
    determining a type of packaging structure to be manufactured;
    determining an available supply of paperboard layers;
    determining a stackup of paperboard layers based on a predetermined caliper of the packaging structure;
    providing a first ply having a first end, a second end, and a first width defined between the first end and the second end, a second ply having a second width, and a third ply having a third width, the third width being greater than the first width and greater than the second width; and forming the packaging structure having the predetermined caliper and including the first ply, the second ply, and the third ply, wherein the step of providing includes providing a plurality of second plies including one second ply and another second ply, each second ply having the second width, and wherein the step of forming includes wrapping the one second ply around the first end of the first ply and not the second end of the first ply, wrapping the another second ply around the second end of the first ply and not the first end of the first ply, and wrapping the third ply around the first ply and the plurality of second plies to form a flat paperboard structure of approximately the first width.

8. The method of claim 7, wherein the step of providing a plurality of second plies includes providing each second ply having a second width greater than the first width.

9. The method of claim 7, wherein the step of forming includes adhering the first ply, the plurality of second plies, and the third ply, and after the step of wrapping, bending the flat paperboard structure to form the packaging structure with an apex and opposite legs extending from the apex.

10. The method of claim 9, wherein the step of providing includes providing a fourth ply having a fourth width less than the first width, and wherein the step of wrapping the third ply includes wrapping the third ply around the fourth ply such that the fourth ply is positioned along one of the opposite legs and spaced from the apex.

11. The method of claim 10, wherein the step of providing includes providing a fifth ply having a fifth width less than the first width, and wherein the step of wrapping the third ply includes wrapping the third ply around the fifth ply such that the fifth ply is positioned across the apex along a portion of each of the opposite legs.

12. The method of claim 9, wherein the step of adhering includes applying a layer of adhesive on the first ply, the one second ply, the another second ply, and the third ply.

13. The method of claim 9, wherein after the step of bending, cutting the packaging structure to a predetermined length.

14. A method of manufacturing a packaging structure, the packaging structure including: (i) a plurality of first plies, each first ply having a first end, a second end, and a first width defined between the first end and the second end, (ii) a plurality of second plies including one second ply and another second ply, each second ply having a second width, and (iii) a third ply having a third width, the third width being greater than the first width and greater than the second width, the method comprising:

adhering the plurality of first plies, the one second ply, the another second ply, and the third ply;

wrapping the one second ply around the first end of each first ply and not the second end of each first ply;

wrapping the another second ply around the second end of each first ply and not the first end of each first ply;

wrapping the third ply around the plurality of first plies and the plurality of second plies to form a flat paperboard structure of approximately the first width; and bending the flat paperboard structure to form the packaging structure.

15. The method of claim 14, wherein the step of adhering includes applying a layer of adhesive on the plurality of first plies, the one second ply, the another second ply, and the third ply.

16. The method of claim 14, further comprising, after the step of bending, cutting the packaging structure to a predetermined length.

17. The method of claim 14, wherein the second width is greater than the first width.

18. The method of claim 14, wherein the step of bending forms the packaging structure with an apex and opposite legs extending from the apex.

19. The method of claim 14, wherein the packaging structure further includes another third ply to provide a plurality of third plies, and wherein the step of wrapping the third ply includes wrapping the plurality of third plies around the plurality of first plies and the plurality of second plies.

20. The method of claim 14, wherein the one second ply and the another second ply overlap each other, and wherein the method includes:

wrapping the one second ply around only the first end of each first ply; and wrapping the another second ply around only the second end of each first ply.

* * * * *